United States Patent
Bookbinder et al.

(10) Patent No.: US 10,611,667 B2
(45) Date of Patent: Apr. 7, 2020

(54) METHOD AND SYSTEM FOR FORMING PERFORATIONS

(71) Applicant: Corning Incorporated, Corning, NY (US)

(72) Inventors: Dana Craig Bookbinder, Corning, NY (US); Stephan Lvovich Logunov, Corning, NY (US); Albert Roth Nieber, Painted Post, NY (US); Pushkar Tandon, Painted Post, NY (US); Sergio Tsuda, Horseheads, NY (US)

(73) Assignee: Corning Incorporated, Corning, NY (US)

( * ) Notice: Subject to any disclaimer, the term of this patent is extended or adjusted under 35 U.S.C. 154(b) by 166 days.

(21) Appl. No.: 15/325,636

(22) PCT Filed: Jul. 14, 2015

(86) PCT No.: PCT/US2015/040250
§ 371 (c)(1),
(2) Date: Jan. 11, 2017

(87) PCT Pub. No.: WO2016/010949
PCT Pub. Date: Jan. 21, 2016

(65) Prior Publication Data
US 2017/0158551 A1 Jun. 8, 2017

Related U.S. Application Data

(60) Provisional application No. 62/024,070, filed on Jul. 14, 2014.

(51) Int. Cl.
*C03B 33/02* (2006.01)
*B23K 26/00* (2014.01)
(Continued)

(52) U.S. Cl.
CPC ...... *C03B 33/0222* (2013.01); *B23K 26/0006* (2013.01); *B23K 26/50* (2015.10); *B23K 26/53* (2015.10); *B23K 2103/54* (2018.08)

(58) Field of Classification Search
CPC .... B23K 26/50; B23K 26/53; B23K 26/0006; B23K 2103/54; C03B 33/0222
See application file for complete search history.

(56) References Cited

U.S. PATENT DOCUMENTS 1,790,397 A   1/1931 Woods et al.
2,682,134 A   6/1954 Stookey
(Continued)

FOREIGN PATENT DOCUMENTS

CN   2388062 Y   7/2000
CN   1283409 C   11/2006
(Continued)

OTHER PUBLICATIONS

Arimoto, R. et al.; Imaging properties of axicon in a scanning optical system; Applied Optics; Nov. 1, 1991; pp. 6653-6657; vol. 31, No. 31; Optical Society of America.
(Continued)

*Primary Examiner* — Queenie S Dehghan
(74) *Attorney, Agent, or Firm* — Smit Kapadia; Svetlana Z. Short

(57) ABSTRACT

The embodiments disclosed herein relate to methods, systems, and system components for creating and arranging small (micron and smaller) defects or perforations in transparent materials in a particular manner, and, more particularly, to the arrangement of these defects, each of which has an average crack length, in a predetermined spaced-apart relation (each defect separated from an adjacent defect by a predetermined distance) defining a contour in a transparent
(Continued)

material to lower the relative interface fracture toughness for subsequent planned induced separation.

18 Claims, 23 Drawing Sheets

(51) Int. Cl.
  *B23K 26/50* (2014.01)
  *B23K 26/53* (2014.01)
  *B23K 103/00* (2006.01)

(56) References Cited

U.S. PATENT DOCUMENTS

| | | |
|---|---|---|
| 2,749,794 A | 6/1956 | O'Leary |
| 3,647,410 A | 3/1972 | Heaton et al. |
| 3,695,497 A | 10/1972 | Dear |
| 3,695,498 A | 10/1972 | Dear |
| 3,729,302 A | 4/1973 | Heaton |
| 3,775,084 A | 11/1973 | Heaton |
| 4,226,607 A | 10/1980 | Domken |
| 4,441,008 A | 4/1984 | Chan |
| 4,546,231 A | 10/1985 | Gresser et al. |
| 4,646,308 A | 2/1987 | Kafka et al. |
| 4,764,930 A | 8/1988 | Bille et al. |
| 4,891,054 A | 1/1990 | Bricker et al. |
| 4,907,586 A | 3/1990 | Bille et al. |
| 4,918,751 A | 4/1990 | Pessot et al. |
| 4,929,065 A | 5/1990 | Hagerty et al. |
| 5,035,918 A | 7/1991 | Vyas |
| 5,040,182 A | 8/1991 | Spinelli et al. |
| 5,104,210 A | 4/1992 | Tokas |
| 5,108,857 A | 4/1992 | Kitayama et al. |
| 5,112,722 A | 5/1992 | Tsujino et al. |
| 5,114,834 A | 5/1992 | Nachshon |
| 5,265,107 A | 11/1993 | Delfyett |
| 5,400,350 A | 3/1995 | Galvanauskas et al. |
| 5,434,875 A | 7/1995 | Rieger et al. |
| 5,436,925 A | 7/1995 | Lin et al. |
| 5,553,093 A | 9/1996 | Ramaswamy et al. |
| 5,574,597 A | 11/1996 | Kataoka et al. |
| 5,586,138 A | 12/1996 | Yokoyama |
| 5,656,186 A | 8/1997 | Mourou et al. |
| 5,676,866 A | 10/1997 | In Den Baumen et al. |
| 5,684,642 A | 11/1997 | Zumoto et al. |
| 5,696,782 A | 12/1997 | Harter et al. |
| 5,736,709 A | 4/1998 | Neiheisel |
| 5,776,220 A | 7/1998 | Allaire et al. |
| 6,016,223 A | 1/2000 | Suzuki et al. |
| 6,016,324 A | 1/2000 | Rieger et al. |
| 6,033,583 A | 3/2000 | Musket et al. |
| 6,038,055 A | 3/2000 | Hansch et al. |
| 6,055,829 A | 5/2000 | Witzmann et al. |
| 6,078,599 A | 6/2000 | Everage et al. |
| 6,156,030 A | 12/2000 | Neev |
| 6,160,835 A | 12/2000 | Kwon |
| 6,186,384 B1 | 2/2001 | Sawada |
| 6,210,401 B1 | 4/2001 | Lai |
| 6,256,328 B1 | 7/2001 | Delfyett et al. |
| 6,259,151 B1 | 7/2001 | Morrison |
| 6,259,512 B1 | 7/2001 | Mizouchi |
| 6,272,156 B1 | 8/2001 | Reed et al. |
| 6,301,932 B1 | 10/2001 | Allen et al. |
| 6,322,958 B1 | 11/2001 | Hayashi |
| 6,339,208 B1 | 1/2002 | Rockstroh et al. |
| 6,373,565 B1 | 4/2002 | Kafka et al. |
| 6,381,391 B1 | 4/2002 | Islam et al. |
| 6,396,856 B1 | 5/2002 | Sucha et al. |
| 6,407,360 B1 | 6/2002 | Choo et al. |
| 6,438,996 B1 | 8/2002 | Cuvelier |
| 6,445,491 B2 | 9/2002 | Sucha et al. |
| 6,449,301 B1 | 9/2002 | Wu et al. |
| 6,484,052 B1 | 11/2002 | Visuri et al. |
| 6,489,589 B1 | 12/2002 | Alexander |
| 6,501,578 B1 | 12/2002 | Bernstein et al. |
| 6,552,301 B2 | 4/2003 | Herman et al. |
| 6,573,026 B1 | 6/2003 | Aitken et al. |
| 6,592,703 B1 | 7/2003 | Habeck et al. |
| 6,635,849 B1 | 10/2003 | Okawa et al. |
| 6,635,850 B2 | 10/2003 | Amako et al. |
| 6,720,519 B2 | 4/2004 | Liu et al. |
| 6,729,161 B1 | 5/2004 | Miura et al. |
| 6,744,009 B1 | 6/2004 | Xuan et al. |
| 6,787,732 B1 | 9/2004 | Xuan et al. |
| 6,800,237 B1 | 10/2004 | Yamamoto et al. |
| 6,800,831 B1 | 10/2004 | Hoetzel |
| 6,958,094 B2 | 10/2005 | Ohmi et al. |
| 6,992,026 B2 | 1/2006 | Fukuyo et al. |
| 7,009,138 B2 | 3/2006 | Amako et al. |
| 7,353,829 B1 | 4/2008 | Wachter et al. |
| 7,402,773 B2 | 7/2008 | Nomaru |
| 7,511,886 B2 | 3/2009 | Schultz et al. |
| 7,535,634 B1 | 5/2009 | Savchenkov et al. |
| 7,633,033 B2 | 12/2009 | Thomas et al. |
| 7,642,483 B2 | 1/2010 | You et al. |
| 7,649,153 B2 | 1/2010 | Haight et al. |
| 7,726,532 B2 | 6/2010 | Gonoe |
| 8,104,385 B2 | 1/2012 | Hayashi et al. |
| 8,118,971 B2 | 2/2012 | Hori et al. |
| 8,132,427 B2 | 3/2012 | Brown et al. |
| 8,168,514 B2 | 5/2012 | Garner et al. |
| 8,245,539 B2 | 8/2012 | Lu et al. |
| 8,245,540 B2 | 8/2012 | Abramov et al. |
| 8,269,138 B2 | 9/2012 | Garner et al. |
| 8,283,595 B2 | 10/2012 | Fukuyo et al. |
| 8,292,141 B2 | 10/2012 | Cox et al. |
| 8,296,066 B2 | 10/2012 | Zhao et al. |
| 8,327,666 B2 | 12/2012 | Harvey et al. |
| 8,341,976 B2 | 1/2013 | Dejneka et al. |
| 8,347,651 B2 | 1/2013 | Abramov et al. |
| 8,358,888 B2 | 1/2013 | Ramachandran |
| 8,444,906 B2 | 5/2013 | Lee et al. |
| 8,448,471 B2 | 5/2013 | Kumatani et al. |
| 8,518,280 B2 | 8/2013 | Hsu et al. |
| 8,549,881 B2 | 10/2013 | Brown et al. |
| 8,584,354 B2 | 11/2013 | Cornejo et al. |
| 8,584,490 B2 | 11/2013 | Garner et al. |
| 8,592,716 B2 | 11/2013 | Abramov et al. |
| 8,604,380 B2 | 12/2013 | Howerton et al. |
| 8,607,590 B2 | 12/2013 | Glaesemann et al. |
| 8,616,024 B2 | 12/2013 | Cornejo et al. |
| 8,635,887 B2 | 1/2014 | Black et al. |
| 8,680,489 B2 | 3/2014 | Martinez et al. |
| 8,685,838 B2 | 4/2014 | Fukuyo et al. |
| 8,697,228 B2 | 4/2014 | Carre et al. |
| 8,720,228 B2 | 5/2014 | Li |
| 8,826,696 B2 | 9/2014 | Brown et al. |
| 8,852,698 B2 | 10/2014 | Fukumitsu |
| 8,887,529 B2 | 11/2014 | Lu et al. |
| 8,916,798 B2 | 12/2014 | Plüss et al. |
| 8,943,855 B2 | 2/2015 | Gomez et al. |
| 8,971,053 B2 | 3/2015 | Kariya et al. |
| 9,138,913 B2 | 9/2015 | Arai et al. |
| 9,227,868 B2 | 1/2016 | Matsumoto et al. |
| 9,290,407 B2 | 3/2016 | Barefoot et al. |
| 9,296,066 B2 | 3/2016 | Hosseini et al. |
| 9,324,791 B2 | 4/2016 | Tamemoto |
| 9,327,381 B2 | 5/2016 | Lee et al. |
| 9,446,590 B2 | 9/2016 | Chen et al. |
| 9,481,598 B2 | 11/2016 | Bergh et al. |
| 2002/0046997 A1 | 4/2002 | Nam et al. |
| 2002/0082466 A1 | 6/2002 | Han |
| 2002/0097486 A1 | 7/2002 | Yamaguchi et al. |
| 2002/0110639 A1 | 8/2002 | Bruns |
| 2003/0006221 A1 | 1/2003 | Hong et al. |
| 2003/0007773 A1 | 1/2003 | Kondo et al. |
| 2004/0221615 A1 | 11/2004 | Postupack et al. |
| 2005/0024743 A1 | 2/2005 | Camy-Peyret |
| 2005/0098548 A1 | 5/2005 | Kobayashi et al. |
| 2005/0115938 A1 | 6/2005 | Sawaki et al. |
| 2005/0274702 A1 | 12/2005 | Deshi |
| 2005/0277270 A1 | 12/2005 | Yoshikawa et al. |
| 2006/0011593 A1 | 1/2006 | Fukuyo |
| 2006/0028728 A1 | 2/2006 | Li |

(56) References Cited

U.S. PATENT DOCUMENTS

| | | |
|---|---|---|
| 2006/0109874 A1 | 5/2006 | Shiozaki et al. |
| 2006/0127679 A1 | 6/2006 | Gulati et al. |
| 2006/0227440 A1 | 10/2006 | Gluckstad |
| 2006/0266744 A1 | 11/2006 | Nomaru |
| 2006/0289410 A1 | 12/2006 | Morita et al. |
| 2007/0091977 A1 | 4/2007 | Sohn et al. |
| 2007/0111390 A1 | 5/2007 | Komura et al. |
| 2007/0111480 A1 | 5/2007 | Maruyama et al. |
| 2007/0119831 A1 | 5/2007 | Kandt |
| 2007/0132977 A1 | 6/2007 | Komatsuda |
| 2007/0138151 A1 | 6/2007 | Tanaka et al. |
| 2007/0177116 A1 | 8/2007 | Amako |
| 2007/0202619 A1 | 8/2007 | Tamura et al. |
| 2007/0298529 A1 | 12/2007 | Maeda et al. |
| 2008/0000884 A1 | 1/2008 | Sugiura et al. |
| 2008/0079940 A1 | 4/2008 | Sezerman et al. |
| 2008/0099444 A1 | 5/2008 | Misawa et al. |
| 2009/0013724 A1 | 1/2009 | Koyo et al. |
| 2009/0176034 A1 | 7/2009 | Ruuttu et al. |
| 2009/0183764 A1 | 7/2009 | Meyer |
| 2009/0242528 A1 | 10/2009 | Howerton et al. |
| 2009/0250446 A1 | 10/2009 | Sakamoto |
| 2009/0294419 A1 | 12/2009 | Abramov et al. |
| 2009/0294422 A1 | 12/2009 | Lubatschowski et al. |
| 2009/0324899 A1 | 12/2009 | Feinstein et al. |
| 2010/0025387 A1 | 2/2010 | Arai et al. |
| 2010/0029460 A1 | 2/2010 | Shojiya et al. |
| 2010/0032087 A1 | 2/2010 | Takahashi et al. |
| 2010/0086741 A1 | 4/2010 | Bovatsek et al. |
| 2010/0089631 A1 | 4/2010 | Sakaguchi et al. |
| 2010/0089882 A1 | 4/2010 | Tamura |
| 2010/0102042 A1 | 4/2010 | Garner et al. |
| 2010/0129603 A1 | 5/2010 | Blick et al. |
| 2010/0147813 A1 | 6/2010 | Lei et al. |
| 2010/0252540 A1 | 10/2010 | Lei et al. |
| 2010/0252959 A1 | 10/2010 | Lei et al. |
| 2010/0276505 A1 | 11/2010 | Smith |
| 2010/0279067 A1 | 11/2010 | Sabia et al. |
| 2010/0287991 A1 | 11/2010 | Brown et al. |
| 2010/0326138 A1 | 12/2010 | Kumatani et al. |
| 2011/0049764 A1 | 3/2011 | Lee et al. |
| 2011/0049765 A1 | 3/2011 | Li et al. |
| 2011/0088324 A1 | 4/2011 | Wessel |
| 2011/0100401 A1 | 5/2011 | Fiorentini |
| 2011/0132881 A1 | 6/2011 | Liu |
| 2011/0139760 A1 | 6/2011 | Shah et al. |
| 2011/0183116 A1 | 7/2011 | Hung et al. |
| 2011/0210105 A1 | 9/2011 | Romashko et al. |
| 2011/0240611 A1 | 10/2011 | Sandström et al. |
| 2011/0277507 A1 | 11/2011 | Lu et al. |
| 2011/0318555 A1 | 12/2011 | Bookbinder et al. |
| 2012/0017642 A1 | 1/2012 | Teranishi et al. |
| 2012/0047951 A1 | 3/2012 | Dannoux et al. |
| 2012/0048604 A1 | 3/2012 | Cornejo et al. |
| 2012/0061440 A1 | 3/2012 | Roell |
| 2012/0064306 A1 | 3/2012 | Kang et al. |
| 2012/0067858 A1 | 3/2012 | Kangastupa et al. |
| 2012/0103018 A1 | 5/2012 | Lu et al. |
| 2012/0131962 A1 | 5/2012 | Mitsugi et al. |
| 2012/0135195 A1 | 5/2012 | Glaesemann et al. |
| 2012/0135607 A1 | 5/2012 | Shimoi et al. |
| 2012/0135608 A1 | 5/2012 | Shimoi et al. |
| 2012/0145331 A1 | 6/2012 | Gomez et al. |
| 2012/0196071 A1 | 8/2012 | Cornejo et al. |
| 2012/0234049 A1 | 9/2012 | Bolton |
| 2012/0234807 A1 | 9/2012 | Sercel et al. |
| 2012/0237731 A1* | 9/2012 | Boegli .................. B82Y 10/00 428/156 |
| 2012/0255935 A1 | 10/2012 | Kakui et al. |
| 2012/0299219 A1 | 11/2012 | Shimoi et al. |
| 2012/0302139 A1 | 11/2012 | Darcangelo et al. |
| 2013/0019637 A1 | 1/2013 | Sol et al. |
| 2013/0034688 A1 | 2/2013 | Koike et al. |
| 2013/0044371 A1 | 2/2013 | Rupp et al. |
| 2013/0056450 A1 | 3/2013 | Lissotschenko et al. |
| 2013/0061636 A1 | 3/2013 | Imai et al. |
| 2013/0068736 A1 | 3/2013 | Mielke et al. |
| 2013/0075480 A1 | 3/2013 | Yokogi et al. |
| 2013/0091897 A1 | 4/2013 | Fugii et al. |
| 2013/0122264 A1 | 5/2013 | Fujii et al. |
| 2013/0126573 A1 | 5/2013 | Hosseini et al. |
| 2013/0129947 A1 | 5/2013 | Harvey et al. |
| 2013/0133367 A1 | 5/2013 | Abramov et al. |
| 2013/0143416 A1 | 6/2013 | Norval |
| 2013/0149434 A1 | 6/2013 | Oh et al. |
| 2013/0149494 A1 | 6/2013 | Koike et al. |
| 2013/0167590 A1 | 7/2013 | Teranishi et al. |
| 2013/0174607 A1 | 7/2013 | Wootton et al. |
| 2013/0174610 A1 | 7/2013 | Teranishi et al. |
| 2013/0180285 A1 | 7/2013 | Kariya |
| 2013/0189806 A1 | 7/2013 | Hoshino |
| 2013/0192305 A1 | 8/2013 | Black et al. |
| 2013/0209731 A1 | 8/2013 | Nattermann et al. |
| 2013/0220982 A1 | 8/2013 | Thomas et al. |
| 2013/0221053 A1 | 8/2013 | Zhang |
| 2013/0224439 A1 | 8/2013 | Zhang et al. |
| 2013/0228918 A1 | 9/2013 | Chen et al. |
| 2013/0247615 A1 | 9/2013 | Boek et al. |
| 2013/0266757 A1 | 10/2013 | Giron et al. |
| 2013/0270240 A1 | 10/2013 | Kondo |
| 2013/0280495 A1 | 10/2013 | Matsumoto |
| 2013/0288010 A1 | 10/2013 | Akarapu et al. |
| 2013/0291598 A1 | 11/2013 | Saito et al. |
| 2013/0312460 A1 | 11/2013 | Kunishi et al. |
| 2013/0323469 A1 | 12/2013 | Abramov et al. |
| 2013/0334185 A1 | 12/2013 | Nomaru |
| 2013/0340480 A1 | 12/2013 | Nattermann et al. |
| 2014/0027951 A1 | 1/2014 | Srinivas et al. |
| 2014/0034730 A1 | 2/2014 | Lee |
| 2014/0042202 A1 | 2/2014 | Lee |
| 2014/0047957 A1 | 2/2014 | Wu |
| 2014/0102146 A1 | 4/2014 | Saito et al. |
| 2014/0110040 A1 | 4/2014 | Cok |
| 2014/0113797 A1 | 4/2014 | Yamada et al. |
| 2014/0133119 A1 | 5/2014 | Kariya et al. |
| 2014/0141217 A1 | 5/2014 | Gulati et al. |
| 2014/0147623 A1 | 5/2014 | Shorey et al. |
| 2014/0147624 A1 | 5/2014 | Streltsov et al. |
| 2014/0165652 A1 | 6/2014 | Saito |
| 2014/0174131 A1 | 6/2014 | Saito et al. |
| 2014/0199519 A1 | 7/2014 | Schillinger et al. |
| 2014/0216108 A1 | 8/2014 | Wiegel et al. |
| 2014/0290310 A1 | 10/2014 | Green |
| 2014/0320947 A1 | 10/2014 | Egerton et al. |
| 2014/0333929 A1 | 11/2014 | Sung et al. |
| 2014/0361463 A1 | 12/2014 | DeSimone et al. |
| 2015/0034612 A1 | 2/2015 | Hosseini et al. |
| 2015/0038313 A1 | 2/2015 | Hosseini |
| 2015/0075221 A1 | 3/2015 | Kawaguchi et al. |
| 2015/0075222 A1 | 3/2015 | Mader |
| 2015/0110442 A1 | 4/2015 | Zimmel et al. |
| 2015/0118522 A1 | 4/2015 | Hosseini |
| 2015/0136743 A1 | 5/2015 | Hosseini |
| 2015/0140241 A1 | 5/2015 | Hosseini |
| 2015/0140735 A1 | 5/2015 | Hosseini |
| 2015/0151380 A1 | 6/2015 | Hosseini |
| 2015/0158120 A1 | 6/2015 | Courvoisier et al. |
| 2015/0165548 A1 | 6/2015 | Marjanovic et al. |
| 2015/0165560 A1 | 6/2015 | Hackert et al. |
| 2015/0165562 A1 | 6/2015 | Marjanovic et al. |
| 2015/0165563 A1 | 6/2015 | Manley et al. |
| 2015/0166391 A1 | 6/2015 | Marjanovic et al. |
| 2015/0166393 A1 | 6/2015 | Marjanovic et al. |
| 2015/0166394 A1 | 6/2015 | Marjanovic et al. |
| 2015/0166395 A1 | 6/2015 | Marjanovic et al. |
| 2015/0166396 A1 | 6/2015 | Marjanovic et al. |
| 2015/0166397 A1 | 6/2015 | Marjanovic et al. |
| 2015/0183679 A1 | 7/2015 | Saito |
| 2015/0232369 A1 | 8/2015 | Marjanovic et al. |
| 2015/0299018 A1 | 10/2015 | Bhuyan et al. |
| 2015/0311058 A1* | 10/2015 | Antsiferov .............. H01J 63/08 313/567 |
| 2015/0360991 A1 | 12/2015 | Grundmueller et al. |
| 2015/0367442 A1 | 12/2015 | Bovatsek et al. |

(56) References Cited

U.S. PATENT DOCUMENTS

| | | |
|---|---|---|
| 2016/0008927 A1 | 1/2016 | Grundmueller et al. |
| 2016/0009066 A1 | 1/2016 | Nieber et al. |
| 2016/0023922 A1 | 1/2016 | Addiego et al. |
| 2016/0031745 A1 | 2/2016 | Ortner et al. |
| 2016/0060156 A1 | 3/2016 | Krueger et al. |
| 2016/0279895 A1 | 9/2016 | Marjanovic et al. |
| 2016/0280580 A1 | 9/2016 | Bohme |
| 2016/0290791 A1 | 10/2016 | Buono et al. |
| 2017/0052381 A1 | 2/2017 | Huang et al. |
| 2017/0169847 A1 | 6/2017 | Tamaki |
| 2017/0368638 A1 | 12/2017 | Tayebati et al. |

FOREIGN PATENT DOCUMENTS

| | | |
|---|---|---|
| CN | 101386466 A | 3/2009 |
| CN | 101502914 A | 8/2009 |
| CN | 201357287 Y | 12/2009 |
| CN | 101637849 A | 2/2010 |
| CN | 201471092 U | 5/2010 |
| CN | 102672355 A | 9/2012 |
| CN | 102898014 A | 1/2013 |
| CN | 102923939 A | 2/2013 |
| CN | 103013374 A | 4/2013 |
| CN | 103143841 A | 6/2013 |
| CN | 203021443 U | 6/2013 |
| CN | 103273195 A | 9/2013 |
| CN | 103316990 A | 9/2013 |
| CN | 103359947 A | 10/2013 |
| CN | 103359948 A | 10/2013 |
| CN | 103531414 A | 1/2014 |
| CN | 103746027 A | 4/2014 |
| CN | 203509350 U | 4/2014 |
| CN | 104344202 A | 2/2015 |
| DE | 2231330 A1 | 10/1974 |
| DE | 102006035555 A1 | 1/2008 |
| DE | 102012010635 A1 | 11/2013 |
| DE | 102012110971 A1 | 5/2014 |
| DE | 102013223637 A1 | 5/2015 |
| EP | 270897 A1 | 2/1992 |
| EP | 609978 A1 | 8/1994 |
| EP | 656241 B1 | 12/1998 |
| EP | 938946 A1 | 9/1999 |
| EP | 949541 A2 | 10/1999 |
| EP | 1159104 B1 | 8/2004 |
| EP | 1609559 A1 | 12/2005 |
| EP | 1043110 B1 | 8/2006 |
| EP | 2133170 A1 | 12/2009 |
| EP | 2202545 A1 | 6/2010 |
| EP | 2574983 A1 | 4/2013 |
| EP | 2754524 A1 | 7/2014 |
| EP | 2781296 A1 | 9/2014 |
| EP | 2783784 A2 | 10/2014 |
| EP | 2859984 A2 | 4/2015 |
| FR | 2989294 A1 | 10/2013 |
| GB | 1242172 A | 8/1971 |
| GB | 2481190 B | 1/2015 |
| JP | 1179770 A | 7/1989 |
| JP | 6318756 | 11/1994 |
| JP | 9109243 A | 4/1997 |
| JP | 11197498 | 7/1999 |
| JP | 11269683 | 10/1999 |
| JP | 11330597 | 11/1999 |
| JP | 11347758 | 12/1999 |
| JP | 2001138083 A | 5/2001 |
| JP | 2002210730 A | 7/2002 |
| JP | 2002228818 A | 8/2002 |
| JP | 2003025085 A | 1/2003 |
| JP | 2003062756 A | 3/2003 |
| JP | 2003114400 A | 4/2003 |
| JP | 2003154517 A | 5/2003 |
| JP | 2003181668 A | 7/2003 |
| JP | 2003238178 A | 8/2003 |
| JP | 2004209675 A | 7/2004 |
| JP | 2005104819 A | 4/2005 |
| JP | 2005205440 A | 8/2005 |
| JP | 2005288503 A | 10/2005 |
| JP | 3775250 B2 | 5/2006 |
| JP | 3775410 B2 | 5/2006 |
| JP | 2006130691 A | 5/2006 |
| JP | 2006248885 A | 9/2006 |
| JP | 2007021548 A | 2/2007 |
| JP | 2007196277 A | 8/2007 |
| JP | 2007253203 A | 10/2007 |
| JP | 2009172633 A | 8/2009 |
| JP | 2010017990 A | 1/2010 |
| JP | 2010046761 A | 3/2010 |
| JP | 4592855 B2 | 12/2010 |
| JP | 2011049398 A | 3/2011 |
| JP | 4672689 B2 | 4/2011 |
| JP | 2011517299 A | 6/2011 |
| JP | 4880820 B2 | 2/2012 |
| JP | 2012024782 A | 2/2012 |
| JP | 2012031018 A | 2/2012 |
| JP | 2012159749 A | 8/2012 |
| JP | 2012187618 A | 10/2012 |
| JP | 2013007842 A | 1/2013 |
| JP | 2013031879 A | 2/2013 |
| JP | 2013043808 A | 3/2013 |
| JP | 2013075802 A | 4/2013 |
| JP | 2013091578 A | 5/2013 |
| JP | 5274085 B2 | 8/2013 |
| JP | 5300544 B2 | 9/2013 |
| JP | 2013187247 A | 9/2013 |
| JP | 2013203630 A | 10/2013 |
| JP | 2013203631 A | 10/2013 |
| JP | 2013223886 A | 10/2013 |
| KR | 2012015366 | 2/2002 |
| KR | 2009057161 | 6/2009 |
| KR | 1020621 | 3/2011 |
| KR | 1120471 | 3/2012 |
| KR | 2012074508 | 7/2012 |
| KR | 2013031380 | 3/2013 |
| KR | 1269474 | 5/2013 |
| KR | 2013124646 | 11/2013 |
| KR | 1344368 | 12/2013 |
| KR | 2014022980 | 2/2014 |
| KR | 2014022981 | 2/2014 |
| KR | 2014064220 | 5/2014 |
| TW | 201139025 A | 11/2011 |
| TW | 201226345 | 7/2012 |
| WO | 1999029243 | 6/1999 |
| WO | 1999063900 | 12/1999 |
| WO | 2004110693 A1 | 12/2004 |
| WO | 2006073098 A1 | 7/2006 |
| WO | 2007094160 A1 | 8/2007 |
| WO | 2008049389 A1 | 5/2008 |
| WO | 2008080182 A1 | 7/2008 |
| WO | 2008128612 A1 | 10/2008 |
| WO | 2009114375 A2 | 9/2009 |
| WO | 2010035736 A1 | 4/2010 |
| WO | 2010111609 A2 | 9/2010 |
| WO | 2010129459 A2 | 11/2010 |
| WO | 2011025908 A1 | 3/2011 |
| WO | 2011056781 A1 | 5/2011 |
| WO | 2012006736 A2 | 1/2012 |
| WO | 2012075072 A2 | 6/2012 |
| WO | 2012108052 A1 | 8/2012 |
| WO | 2012166753 A1 | 12/2012 |
| WO | 2013022148 A1 | 2/2013 |
| WO | 2013043173 A1 | 3/2013 |
| WO | 2013138802 A1 | 9/2013 |
| WO | 2013150990 A1 | 10/2013 |
| WO | 2013153195 A1 | 10/2013 |
| WO | 2014028022 A1 | 2/2014 |
| WO | 2014064492 A1 | 5/2014 |
| WO | 2014079478 A1 | 5/2014 |
| WO | 2014079570 A1 | 5/2014 |
| WO | 2014085663 A1 | 6/2014 |
| WO | 2014111385 A1 | 7/2014 |
| WO | 2014111794 A1 | 7/2014 |
| WO | 2014161534 A2 | 10/2014 |
| WO | 2014161535 A2 | 10/2014 |
| WO | 2015077113 A1 | 5/2015 |
| WO | 2015095088 A1 | 6/2015 |

(56) References Cited

FOREIGN PATENT DOCUMENTS

| WO | 2015095090 A1 | 6/2015 |
|---|---|---|
| WO | 2015095146 A1 | 6/2015 |
| WO | 2015127583 A1 | 9/2015 |
| WO | 2016005455 A1 | 1/2016 |
| WO | 2016010954 A2 | 1/2016 |
| WO | 20160154284 A1 | 9/2016 |

OTHER PUBLICATIONS

Betriebsanleitung; TruMicro 5000; Aug. 2011; pp. 1-4.
Bhuyan, M. et al.; High aspect ratio nanochannel machining using single shot femtosecond Bessel beams; Applied Physics Letters; Aug. 23, 2010; pp. 081102-1-081102-3; vol. 97.
Bhuyan, M. et al.; High aspect ratio taper-free microchannel fabrication using femtosecond Bessel beams; Optics Express; Jan. 18, 2010; pp. 566-574; vol. 18, No. 2; Optical Society of America.
Cubeddu, R. et al.; A compact time-resolved reflectance system for dual-wavelength multichannel assessment of tissue absorption and scattering; SPIE Conference on Optical Tomography and Spectroscopy of Tissue III; San Jose, California; Jan. 1999; pp. 450-455; vol. 3597; SPIE.
Cubeddu, R. et al.; Compact tissue oximeter based on dual-wavelength multichannel time-resolved reflectance; Applied Optics; Jun. 1, 1999; pp. 3670-3680; vol. 38, No. 16; Optical Society of America.
Ding, Z. et al.; High-resolution optical coherence tomography over a large depth range with an axicon lens; Optics Letters; Feb. 15, 2002; pp. 243-245; vol. 27, No. 4; Optical Society of America.
EagleEtch; TheAnti-glare Glass for Technical Display Applications; Glass and Polymer Technologies; pp. 1-8; EuropTec USA Inc.
Girkin, J. et al.; Macroscopic multiphoton biomedical imaging using semiconductor saturable Bragg reflector modelocked Lasers; SPIE Conference on Commercial and Biomedical Applications of Ultrafast Lasers; San Jose, California; Jan. 1999; pp. 92-98; vol. 3616; SPIE.
Glezer, E. et al.; Ultrafast-laser driven micro-explosions in transparent materials; Applied Physics Letters; 1997; pp. 882-884, vol. 71.
Golub, I.; Fresnel axicon; Optics Letters; Jun. 15, 2006; pp. 1890-1892;. vol. 31, No. 12; Optical Society of America.
Herman, P. et al.; Laser micromachining of 'transparent' fused silica with 1-ps pulses and pulse trains; SPIE Conference on Commercial and Biomedical Applications of Ultrafast Lasers; San Jose, California; Jan. 1999; pp. 148-155; vol. 3616; SPIE.
Kosareva, O. et al.; Formation of extended plasma channels in a condensed medium upon axicon focusing of a femtosecond laser pulse; Quantum Electronics; 2005; pp. 1013-1014; vol. 35, No. 11; Kvantovaya Elektronika and Turpion Ltd.
Kruger, J. et al.; Femtosecond-pulse visible laser processing of transparent materials; Applied Surface Science; 1996; pp. 430-438; Elsevier B.V.
Kruger, J. et al.; Laser micromachining of barium aluminium borosilicate glass with pulse durations between 20 fs and 3 ps; Applied Surface Science; 1998; pp. 892-898; Elsevier B.V.
Kruger, J. et al.; Structuring of dielectric and metallic materials with ultrashort laser pulses between 20 fs and 3 ps; SPIE Proceedings; San Jose, California; Feb. 8, 1997; pp. 40-47 vol. 2991; SPIE.
Lapczyna, M. et al.; Ultra high repetition rate (133 MHz) laser ablation of aluminum with 1.2-ps pulses; Applied Physics A Materials Science & Processing; Dec. 28, 1999; pp. S883-S886; vol. 69 (Suppl).; Springer-Verlag.
Perry, M. et al.; Ultrashort-Pulse Laser Machining; Lawrence Livermore National Laboratory; Sep. 1998; pp. i-30.
Perry, M. et al.; Ultrashort-Pulse Laser Machining; International Congress on Applications of Lasers and Electro-Optics; Orlando, Florida; Nov. 16-19, 1998; pp. 1-24.
Perry, M. et al.; Ultrashort-pulse laser machining of dielectric materials; Journal of Applied Physics; May 1, 1999; pp. 6803-6810; vol. 85, No. 9; American Institute of Physics.
PHAROS High-power Femtosecond Laser System specification; Light Conversion; 2011; pp. 1-2.
Polynkin, P. et al.; Extended filamentation with temporally chirped femtosecond Bessel-Gauss beams in air; Optics Express; Jan. 19, 2009; pp. 575-584; vol. 17, No. 2; Optical Society of America.
Serafetinides, A. et al.; Ultra-short pulsed laser ablation of polymers; Applied Surface Science; 2011; pp. 42-56; vol. 180; Elsevier Science B.V.
Sundaram, S. et al.; Inducing and probing non-thermal transitions in semiconductors using femtosecond laser pulses; Nature Materials; Dec. 2002; pp. 217-224; vol. 1; Nature Publishing Group.
Vanagas, E. et al.; Glass cutting by femtosecond pulsed irradiation; Journal of Micro/Nanolithography, MEMS, and MOEMS; Mar. 31, 2004; pp. 1-18; vol. 3, Issue 2; SPIE.
Varel, H. et al.; Micromachining of quartz with ultrashort laser pulses; Applied Physics A Materials Science & Processing; 1997; pp. 367-373; vol. 65.
Yoshino, F. et al.; Micromachining with a High Repetition Rate Femtosecond Fiber Laser; JLMN-Journal of Laser Micro/Nanoengineering; 2008; pp. 157-162; vol. 3, No. 3.
Zeng, D. et al.; Characteristic analysis of refractive axicon system for optical trepanning; Optical Engineering; Sep. 2006; pp. 094302-1-094302-10; vol. 45, No. 9.
Zhang, G. et al.; Design of diffractive-phase axicon illuminated by a Gaussian-profile beam; Acta Physica Sinica; May 1996; pp. 354-364; vol. 5, No. 5; Chin. Phys. Soc.
Kerr. "Filamentary tracks formed in transparent optical glass by laser beam self-focusing. II. Theoretical Analysis" Physical Review A. 4(3) 1971, pp. 1196-1218.
Abakians, H. et al.; Evaporative Cutting of a Semitransparent Body With a Moving CW Laser; Journal of Heat Transfer; Nov. 1988; pp. 924-930; vol. 110; ASME.
Ahmed, F. et al.; Display glass cutting by femtosecond laser induced single shot periodic void array; Applied Physics A Material Science & Processing; Jun. 3, 2008; pp. 189-192; vol. 93; Springer-Verlag.
Bagchi, S. et al.; Fast ion beams from intense, femtosecond laser irradiated nanostructured surfaces; Applied Physics B Lasers and Optics; Jun. 27, 2007; pp. 167-173; vol. 88; Springer-Verlag.
Bhuyan, M.K. et al.; Femtosecond non-diffracting Bessel beams and controlled nanoscale ablation; ResearchGate Conference Paper; Sep. 2011; pp. 1-4.
Bhuyan, M.K. et al.; Laser micro- and nanostructuring using femtosecond Bessel beams; The European Physical Journal Special Topics; Dec. 7, 2011; pp. 101-110; vol. 1999; EDP Sciences, Springer-Verlag.
Bhuyan, M.K. et al.; Single-shot high aspect ratio bulk nanostructuring of fused silica using chirp-controlled ultrafast laser Bessel beams; Applied Physics Letters; Jan. 14, 2014; pp. 021107-1-021107-4; vol. 104; AIP Publishing LLC.
Bhuyam, M.K. et al.; Ultrafast Bessel beams for high aspect ratio taper free micromachining of glass; Nonlinear Optics and Applications IV; 2010; pp. 77281V-1-77281V-8; vol. 7728; SPIE.
Case Design Guidelines for Apple Devices; Sep. 13, 2013; pp. 1-58; Apple Inc.
Chiao, R. Y. et al.; Self-Trapping of Optical Beams; Physical Review Letters; Oct. 12, 1964; pp. 479-482; vol. 13, No. 15.
Corning Eagle AMLCD Glass Substrates Material Information; Apr. 2005; pp. MIE 201-1-MIE 201-3; Corning Incorporated.
Corning 1737 AMLCD Glass Substrates Material Information; Aug. 2002; pp. MIE 101-1-MIE 101-3; Corning Incorporated.
Couairon, A. et al.; Femtosecond filamentation in transparent media; ScienceDirect Physical Reports; Feb. 6, 2007; pp. 47-189; vol. 441; Elsevier B.V.
Courvoisier, F. et al.; Applications of femtosecond Bessel beams to laser ablation; Applied Physics A Materials Science & Processing; Sep. 6, 2012; pp. 29-34; vol. 112; Springer-Verlag.
Courvoisier, F. et al.; Surface nanoprocessing with nondiffracting femtosecond Bessel beams; Optics Letters; Oct. 15, 2009; pp. 3163-3165; vol. 34, No. 20; Optical Society of America.
Dong, M. et al.; On-axis irradiance distribution of axicons illuminated by spherical wave; ScienceDirect Optics & Laser Technology; Sep. 2007; pp. 1258-1261; vol. 39; Elsevier Ltd.

(56) References Cited

OTHER PUBLICATIONS

Duocastella, M. et al.; Bessel and annular beams for materials processing; Laser & Photonics Reviews; 2012; pp. 607-621; vol. 6, No. 5.
Durnin, J.; Exact solutions for nondiffracting beams. I. The scalar theory; J. Opt. Soc. Am. A; Apr. 1987; pp. 651-654; vol. 4, No. 4; Optical Society of America.
Eaton, S. et al.; Heat accumulation effects in femtosecond laser-written waveguides with variable repetition rate; Optics Express; Jun. 13, 2005; pp. 4708-4716; vol. 13, No. 12; Optical Society of America.
Gattass, R. et al.; Micromachining of bulk glass with bursts of femtosecond laser pulses at variable repetition rates; Optics Express; Jun. 12, 2006; pp. 5279-5284; vol. 14, No. 12; Optical Society of America.
Gori, F. et al.; Analytical derivation of the optimum triplicator; Optics Communications; Dec. 1, 1998; pp. 13-16; vol. 157; Elsevier B.V.
Honda, M. et al.; A Novel Polymer Film that Controls Light Transmission; Progress in Pacific Polymer Science 3; 1994; pp. 159-169; Springer-Verlag Berlin Heidelberg.
Hu, Z. et al.; 5-Axis Laser Cutting Interference Detection and Correction Based on STL Model; Chinese Journal of Lasers; Dec. 2009; pp. 3313-3317; vol. 36, No. 12.
Huang, Z. et al.; Laser etching of glass substrates by 1064 nm laser irradiation; Applied Physics A Materials Science & Processing; Jun. 6, 2008; pp. 159-163; vol. 93; Springer-Verlag.
Juodkazis, S. et al.; Laser-Induced Microexplosion Confined in the Bulk of a Sapphire Crystal: Evidence of Multimegabar Pressures; Physical Review Letters; Apr. 28, 2006; pp. 166101-1-166101-4; vol. 96; The American Physical Society.
Karlsson, S. et al.; The Technology of Chemical Glass Strengthening—A Review; Glass Technology—European Journal of Glass Science and Technology Part A; Apr. 2010; pp. 41-54; vol. 51, No. 2.
Levy, U. et al.; Design, fabrication, and characterization of circular Dammann gratings based on grayscale lithography; Optics Letters; Mar. 15, 2010; pp. 880-882; vol. 35, No. 6; Optical Society of America.
Liu, X. et al.; Laser Ablation and Micromachining with Ultrashort Laser Pulses; IEEE Journal of Quantum Electronics; Oct. 1997; p. 1706-1716; vol. 33, No. 10; IEEE.
Maeda, K. et al.; Optical performance of angle dependent light control glass; Optical Materials Technology for Energy Efficiency and Solar Energy Conversion X; 1991; pp. 138-148; vol. 1536; SPIE.
Mbise, G. et al.; Angular selective window coatings; theory and experiments; J. Phys. D: Appl. Phys.; 1997; pp. 2103-2122; vol. 30; IOP Publishing Ltd.
McGloin, D. et al.; Bessel beams: diffraction in a new light; Contemporary Physics; Jan.-Feb. 2005; pp. 15-28; vol. 46; Taylor & Francis Ltd.
Merola, F. et al.; Characterization of Bessel beams generated by polymeric microaxicons; Measurement Science and Technology; May 15, 2012; pp. 1-10; vol. 23; IOP Publishing Ltd.
Mirkhalaf, M. et al.; Overcoming the brittleness of glass through bio-inspiration and micro-architecture; Nature Communications; Jan. 28, 2014; pp. 1-9; Macmillan Publishers Limited.
Romero, L. et al.; Theory of optimal beam splitting by phase gratings. II. Square and hexagonal gratings; J. Opt. Soc. Am. A; Aug. 2007; pp. 2296-2312; vol. 24, No. 8; Optical Society of America.
Salleo, A. et al.; Machining of transparent materials using an IR and UV nanosecond pulsed laser; Applied Physics A Materials Science & Processing; Sep. 20, 2000; pp. 601-608; vol. 71; Springer-Verlag.
Serafetinides, A. et al.; Polymer Ablation by Ultra-Short Pulsed Lasers; Proceedings of SPIE; 2000; pp. 409-415.
Shah, L. et al.; Micromachining with a High Repetition Rate Femtosecond Fiber Laser; JLMN-Journal of Laser Micro/Nanoengineering; Nov. 2008; pp. 157-162; vol. 3, No. 3.
Shealy, D. et al.; Geometric optics-based design of laser beam shapers; Opt. Eng.; Nov. 2003; pp. 3123-3138; vol. 42, No. 11; Society of Photo-Optical Instrumentation Engineers.
Yan, Y. et al.; Fiber structure to convert a Gaussian beam to higher-order optical orbital angular momentum modes; Optics Letters; Aug. 15, 2012; pp. 3294-3296; vol. 37, No. 16; Optical Society of America.
Abramov, A. et al.; Laser separation of chemically strengthened glass; ScienceDirect Physics Procedia; 2010; pp. 285-290; vol. 5; Elsevier B.V.
Stoian, R. et al.; Spatial and temporal laser pulse design for material processing on ultrafast scales; Applied Physics A Materials Science & Processing; Jan. 1, 2014; pp. 119-127; vol. 114; Springer-Verlag Berlin Heidelberg.
Thiele, E.; Relation between Catalytic Activity and Size of Particle; Industrial and Engineering Chemistry; Jul. 1939; pp. 916-920; vol. 31, No. 7.
Toytman, I. et al.; Optical breakdown in transparent media with adjustable axial length and location; Optic Express; Nov. 22, 2010; pp. 24688-24698; vol. 18, No. 24; Optical Society of America.
Velpula, P. et al.; Ultrafast imaging of free carriers: controlled excitation with chirped ultrafast laser Bessel beams; Laser Applications in Microelectronic and Optoelectronic Manufacturing (LAMOM) XIX; Proc. of SPIE; 2014; pp. 896711-1-896711-8; vol. 8967; SPIE.
Wang, Z. et al.; Investigation on CO2 laser irradiation inducing glass strip peeling for microchannel formation; Biomicrofluidics; Mar. 12, 2012; pp. 012820-1-012820-12; vol. 6; American Institute of Physics.
Ra & RMS: Calculating Surface Roughness; Harrison Eelectropolishing; 2012.
Wu, W. et al.; Optimal Orientation of the Cutting Head for Enhancing Smoothness Movement in Three-Dimensional Laser Cutting; Chinese Journal of Lasers; Jan. 2013; pp. 0103005-1-0103005-7, vol. 10, No. 1.
GT ASF Grown Sapphire Cover and Touch Screen Material; www.gtat.com; 2012; pp. 1-2; GTAT Corporation.
Xu, H. et al.; Optimization of 3D laser cutting head orientation based on minimum energy consumption; Int J Adv Manuf Technol; Jun. 28, 2014; pp. 1283-1291; vol. 74; Springer-Verlag London.

* cited by examiner

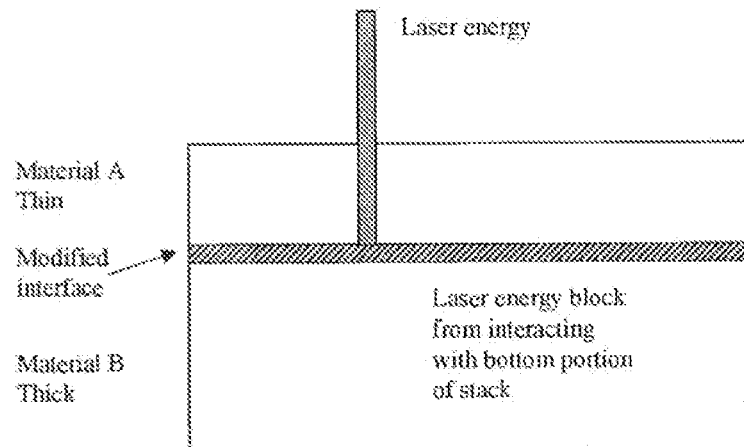
FIG. 1
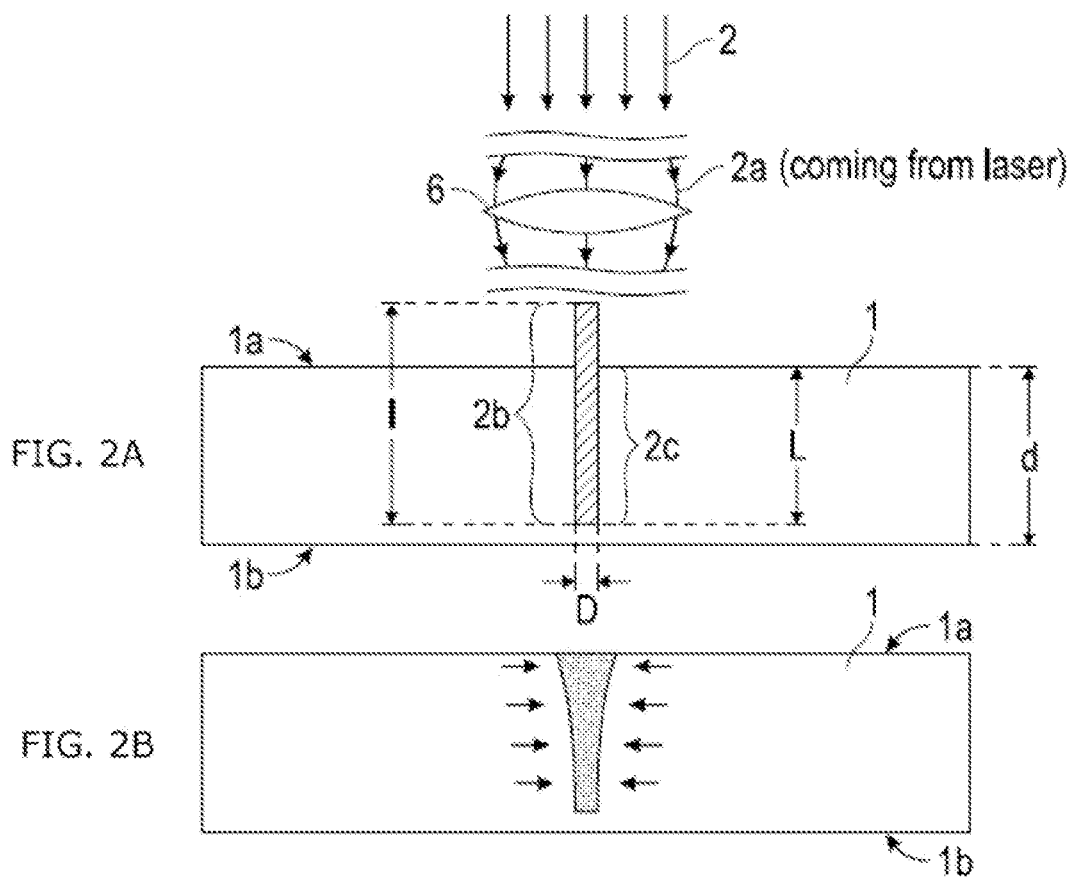
FIG. 2A
FIG. 2B

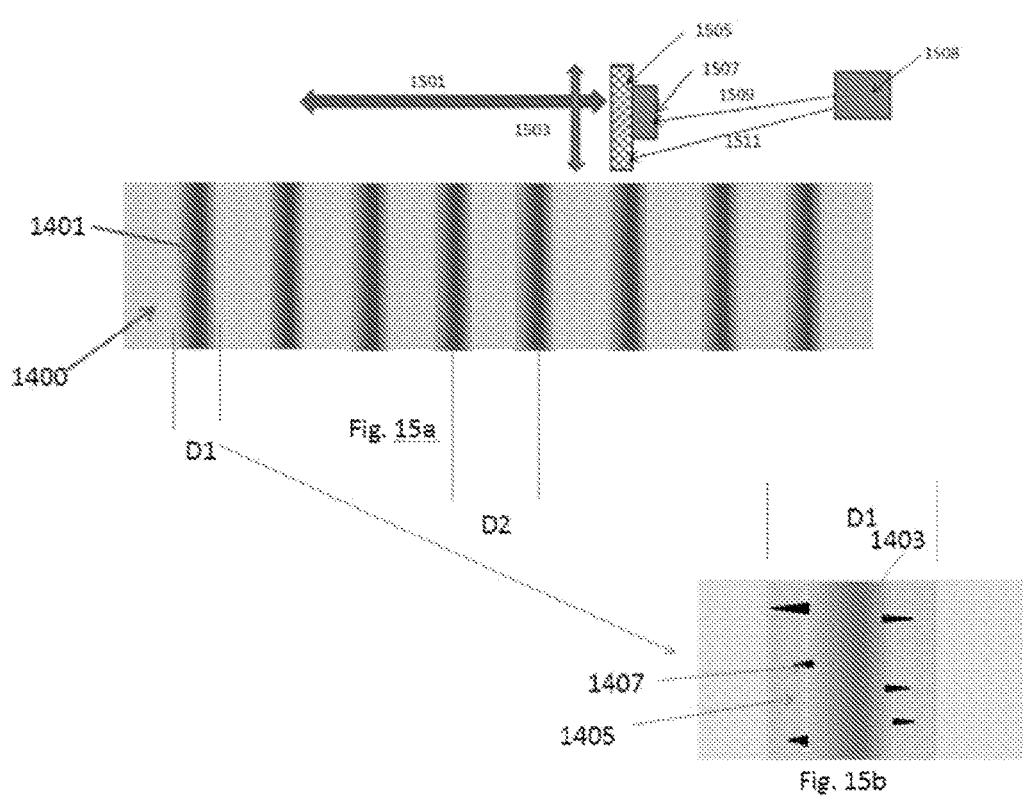

METHOD AND SYSTEM FOR FORMING PERFORATIONS

CROSS-REFERENCE TO RELATED APPLICATIONS

This application claims the benefit of priority under 35 U.S.C. § 371 of International Application No. PCT/US2015/40250, filed on Jul. 14, 2015, which claims the benefit of priority under 35 U.S.C. § 119 of U.S. Provisional Application Ser. No. 62/024,070 filed on Jul. 14, 2014 the content of which is relied upon and incorporated herein by reference in its entirety.

BACKGROUND

The embodiments disclosed herein relate to methods, systems, and system components for creating and arranging small (micron and smaller) defects or perforations in transparent materials in a particular manner, and, more particularly, to the arrangement of these defects, each of which has an average crack length, in a predetermined spaced-apart relation (each defect separated from an adjacent defect by a predetermined distance) defining a contour in a transparent material to lower the relative interface fracture toughness for subsequent planned induced separation.

In recent years, precision micromachining and related process improvements to meet customer demands to reduce the size, weight and material cost of leading-edge devices has led to fast pace growth in high-tech industries in flat panel displays for touch screens, tablets, smartphones and televisions. Moreover, ultrafast industrial lasers are becoming important tools for applications requiring high precision micromachining.

Relatively large glass sheets/substrates are typically delivered to manufacturers; and thus, they need to be cut into smaller sizes before being further processed. (Such processing may include additional layers of coating, thin film transistors ("TFTs") or other value adding attributes of the glass surface. In many conventional laser glass cutting processes, the separation of glass into smaller sheets relies on laser scribing or perforation followed by separation with mechanical force or thermal stress-induced crack propagation. Nearly all current laser cutting techniques exhibit one or more shortcomings, including: (1) limitations in their ability to perform a free form shaped cut of thin glass on a carrier due to a large heat-affected zone associated with the long laser pulses (nanosecond scale or longer) used for cutting; (2) production of thermal stress that often results in cracking of the glass surface near the region of laser illumination due to the generation of shock waves and uncontrolled material removal; (3) difficulties in controlling the depth of the cut (e.g., to within tens of microns); and/or (4) creation of sub-surface damage in the glass that extends hundreds of microns (or more) glass below the surface of the glass, resulting in defect sites at which crack propagation can initiate.

Some glasses are easily separated with conventional tools such as mechanical cutting equipment, or CO2 laser cutting processes. Some glasses are difficult to cut using these techniques, and more complicated and sophisticated equipment may be needed. For example, mechanically or chemically strengthened glasses are difficult to cut using the aforementioned mechanical tools or $CO_2$ lasers. Thin glasses (<0.2 mm thick) are another example of glasses that are difficult to cut using conventional equipment. Glass-ceramics and other transparent materials characterized by a high fracture toughness are also difficult to separate using conventional mechanical tools. Accordingly, there is a need to address the aforementioned issues and provide improved glass separation equipment and techniques.

SUMMARY

The embodiments disclosed herein relate to a method and an apparatus to create small (micron and smaller) "holes" in transparent materials (glass, sapphire, etc) for the purpose of drilling, cutting, separating, perforating, or otherwise processing the materials. More particularly, an ultrashort (i.e., from $10^{-10}$ to $10^{-15}$ second) pulse laser beam (wavelengths such as 1064, 532, 355 or 266 nanometers) is focused to an energy density above the threshold needed to create a defect in the region of focus at the surface of or within the transparent material. By repeating the process, a series of laser-induced defects aligned along a predetermined path can be created. By spacing the laser-induced features sufficiently close together, a controlled region of mechanical weakness within the transparent material can be created and the transparent material can be precisely fractured or separated (mechanically or thermally) along the path defined by the series of laser-induced defects. The ultrashort laser pulse(s) may be optionally followed by a carbon dioxide ($CO_2$) laser or other source of thermal stress to effect fully automated separation of a transparent material or part from a substrate, for example.

In certain applications where transparent materials are bonded together to form a stack or layered structure, it is often desirable to selectively "cut" to the boundary of a particular layer without disturbing underlying layers. This may be performed with the addition of a reflective or absorptive (for the desired wavelength) material or layer at the preferred depth of cut. A reflective layer may be formed by depositing a thin material (aluminum, copper, silver, gold, etc). A reflective layer is preferential as it scatters the incident energy (as opposed to absorbing and thermally dissipating the incident energy). In this manner, the depth of the cut may be controlled with no damage to the underlying layers. In one application, a transparent material is bonded to a carrier substrate and a reflective or absorptive layer is formed between the transparent material and carrier substrate. The reflective or absorptive layer enables cutting of the transparent material without damage to the underlying carrier substrate, which may then be reused.

In one embodiment, a method of laser processing includes focusing a pulsed laser beam into a laser beam focal line directed into a workpiece. The workpiece has a glass layer, the laser beam focal line generates an induced absorption within the workpiece, and the induced absorption produces a defect line along the laser beam focal line within the workpiece. The method also includes translating the workpiece and the laser beam relative to each other along a contour, thereby forming a plurality of defect lines along the contour, and separating the workpiece along the contour by mechanical or other separation techniques (as should be appreciated by those skilled in the art).

In another embodiment, a system is provided for forming a plurality of defects defining a contour in a workpiece, where the workpiece includes a glass substrate including at least one layer and having a pre-defect formation fracture toughness rating of 1. The system can include, but is not limited to, the following: a laser assembly configured to provide a plurality of laser pulse emissions, each laser pulse emission of the plurality of laser pulse emissions having predetermined characteristics selected from the group consisting of wavelength, power level, pulse duration, and a laser pulse emission rate; an optical assembly coupled to the laser assembly, the optical assembly being configured and moveable to focus each laser pulse emission to a different focal line at a different position within the workpiece, where: each different focal line is separated from an adjacent different focal line by a predetermined distance, a corresponding defect with an average crack length is formed in the workpiece along each different focal line to form a plurality of defects defining a contour in the workpiece, and each of the defects being substantially generated by induced absorption; a workpiece holder configured to hold the workpiece at a position relative to the optical assembly, the workpiece holder or the optical assembly being configured to provide a relative motion between the workpiece and the optical assembly; and a controller coupled to the laser assembly, the optical assembly or the workpiece holder, the controller being configured to execute instructions representing a predetermined design, the controller being configured to select the predetermined characteristics, the different positions, the predetermined distances, the average crack lengths, or the relative motion such that a ratio of an average of the predetermined distances to an average of the averaged crack lengths results in the workpiece having a post-defect formation fracture toughness rating along the contour of less than 1.

In yet another embodiment, a method is provided for forming a plurality of defects defining a contour in a workpiece, where the workpiece includes a glass substrate including at least one layer and having a pre-defect formation fracture toughness rating of 1. The method can include, but is not limited to, the following steps: focusing each of a plurality of laser pulse emissions to a different focal line at a different position within the workpiece wherein: each laser pulse emission has predetermined characteristics selected from the group consisting of wavelength, power level, pulse duration, and a laser pulse emission rate, and each different focal line is separated from an adjacent different focal line by a predetermined distance; generating, along each different focal line, an induced absorption within the workpiece, each induced absorption forming a corresponding defect with an average crack length in the workpiece along each different focal line to form a plurality of defects defining a contour in the workpiece; and wherein a ratio of an average of the predetermined distances to an average of the averaged crack lengths results in the workpiece having a post-defect formation fracture toughness rating along the contour of less than 1.

In yet another embodiment, a method of laser processing is provided. The can include, but is not limited to, the following steps: focusing a pulsed laser beam into a laser beam focal line directed into a workpiece, the workpiece having a glass layer and a pre-defect formation fracture toughness rating of 1; generating, by the laser beam focal line, an induced absorption within the workpiece, the induced absorption producing a defect line along the laser beam focal line within the workpiece; translating the workpiece and the laser beam relative to each other along a contour, thereby forming a plurality of defect lines along the contour, each of the defect line comprises an average crack length and is separated from an adjacent different defect line by a predetermined distance; and wherein a ratio of an average of the predetermined distances to an average of the averaged crack lengths results in the workpiece having a post-defect formation fracture toughness rating along the contour of less than 1.

Advantages of perforating glass substrates according to the various embodiments described herein include, but art not limited to, (i) providing a glass substrate with a lowered relative fracture toughness (created by the optimally sized and spaced-apart perforations along an interface defining a contour), and (ii) being able to handle and transport the perforated glass substrate as a monolithic piece until subsequent separation to predetermined dimensions by any known or to be developed separation equipment or technique along the contour is desired/required (and before or after processing of any kind, such as films deposition). Stated differently, forming the optimally sized and spaced-apart perforations allow for tuning of the relative interface fracture toughness of a glass substrate (no matter the type of glass), so that the relative toughness is high enough that the glass does not spontaneously separate (propagation of a crack) along the contour during transport, for example, yet is low enough making separation along the interface/contour easier than without the perforations being present. This way, a mechanical scribe or thermally induced stress, for example, can lead to crack propagation along these created earlier damage sites when needed/desired. As a result the glass piece can be perforated (as needed upon demand) with such sites along desired future separation lines. This perforated glass can be processed as a solid piece, and separated after processing.

Additional features and advantages will be set forth in the detailed description which follows, and in part will be readily apparent to those skilled in the art from that description or recognized by practicing the embodiments as described herein, including the detailed description which follows, the claims, as well as the appended drawings.

It is to be understood that both the foregoing general description and the following detailed description are merely exemplary, and are intended to provide an overview or framework to understanding the nature and character of the claims. The accompanying drawings are included to provide a further understanding, and are incorporated in and constitute a part of this specification. The drawings illustrate one or more embodiment(s), and together with the description serve to explain principles and operation of the various embodiments

BRIEF DESCRIPTION OF THE DRAWINGS

The foregoing will be apparent from the following more particular description of the example embodiments, as illustrated in the accompanying drawings in which like reference characters refer to the same parts throughout the different views. The drawings are not necessarily to scale, emphasis instead being placed upon illustrating the representative embodiments.

FIG. 1 is an illustration of a stack of three layers according to an embodiment: a thin material A facing the laser energy, a modified interface, and a thick material B, the modified interface disrupting the laser energy form interacting with the portion of the stack on the side of the modified interface remote from the laser beam;

FIGS. 2A and 2B are illustrations showing the positioning of a laser beam focal line according to an embodiment;

FIGS. 3B-1, 3B-2, 3B-3, and 3B-4 illustrate various possibilities for processing the substrate by forming the laser beam focal line at different positions within the transparent material relative to the substrate according to embodiments;

FIG. 4 is an illustration of a second optical assembly for laser processing according to an embodiment;

FIG. 15a is a side view of a glass substrate showing the interface of the glass substrate, a laser assembly connected to an optical assembly, a moving apparatus connected to the laser assembly and/or optical assembly, and a controller above the glass substrate according to an embodiment;

FIG. 15b is a magnified side view of D1 shown in FIG. 15a showing the local damage site with the perforation, the stress field and all micro cracks in a glass substrate according to an embodiment;

DETAILED DESCRIPTION

Figure 3A:
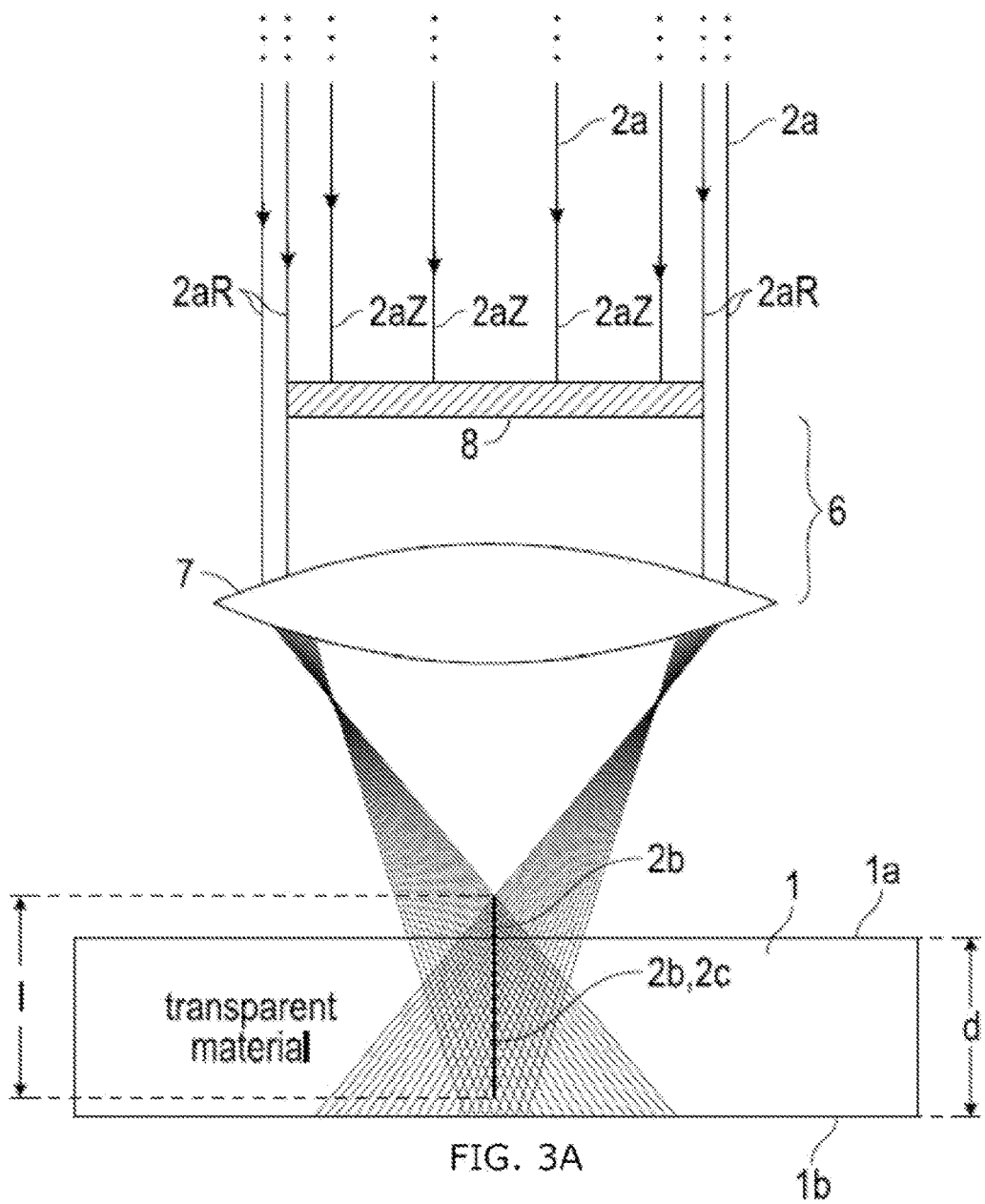
FIG. 3A is an illustration of an optical assembly for laser processing according to an embodiment.

A description of example embodiments follows.

The embodiment described herein relates to a method and apparatus for optically producing high precision cuts in or through transparent materials. Sub-surface damage may be limited to the order of 60 microns in depth or less, and the cuts may produce only low debris. Cutting of a transparent material with a laser in accordance with the present disclosure may also be referred to herein as drilling or laser drilling or laser processing. A material is substantially transparent to the laser wavelength when the absorption is less than about 10%, preferably less than about 1% per mm of material depth at this wavelength.

In accordance with methods described below, in a single pass, a laser can be used to create highly controlled full line perforation through the material, with extremely little (<75 μm, often <50 μm) subsurface damage and debris generation. This is in contrast to the typical use of spot-focused laser to ablate material, where multiple passes are often necessary to completely perforate the glass thickness, large amounts of debris are formed from the ablation process, and more extensive sub-surface damage (>100 μm) and edge chipping occur.

Thus, it is possible to create a microscopic (i.e., <0.5 μm and >100 nm in diameter) elongated "hole" (also called a perforation or a defect line) in transparent material using a single high energy burst pulse. These individual perforations can be created at rates of several hundred kilohertz (several hundred thousand perforations per second, for example). Thus, with relative motion between the source and the material these perforations can be placed adjacent to one another (spatial separation varying from sub-micron to several microns as desired). This spatial separation is selected in order to facilitate cutting. In some embodiments the defect line is a "through hole", which is a hole or an open channel that extends from the top to the bottom of the transparent material. In some embodiments the defect line may not be a continuous channel, and may be blocked or partially blocked by portions or sections of solid material (e.g., glass). As defined herein, the internal diameter of the defect line is the internal diameter of the open channel or the air hole. For example, in the embodiments described herein the internal diameter of the defect line is <500 nm, for example ≤400 nm, or ≤300 nm. The disrupted or modified area (e.g., compacted, melted, or otherwise changed) of the material surrounding the holes in the embodiments disclosed herein, preferably has diameter of <50 μm (e.g., <10 μm).

In addition, through judicious selection of optics, selective cut individual layers of stacked transparent materials. Micromachining and selective cutting of a stack of transparent materials is accomplished with precise control of the depth of cut through selection of an appropriate laser source and wavelength along with beam delivery optics, and the placement of a beam disruption element at the boundary of a desired layer. The beam disruption element may be a layer of material or an interface. The beam disruption element may be referred to herein as a laser beam disruption element, disruption element or the like. Embodiments of the beam disruption element may be referred to herein as a beam disruption layer, laser beam disruption layer, disruption layer, beam disruption interface, laser beam disruption interface, disruption interface, or the like.

The beam disruption element reflects, absorbs, scatters, defocuses or otherwise interferes with an incident laser beam to inhibit or prevent the laser beam from damaging or otherwise modifying underlying layers in the stack. In one embodiment, the beam disruption element underlies the layer of transparent material in which laser drilling will occur. As used herein, the beam disruption element underlies the transparent material when placement of the beam disruption element is such that the laser beam must pass through the transparent material before encountering the beam disruption element. The beam disruption element may underlie and be directly adjacent to the transparent layer in which laser drilling will occur. Stacked materials can be micro-machined or cut with high selectivity by inserting a layer or modifying the interface such that a contrast of optical properties exists between different layers of the stack. By making the interface between materials in the stack more reflective, absorbing, and/or scattering at the laser wavelengths of interest, cutting can be confined to one portion or layer of the stack.

The wavelength of the laser is selected so that the material within the stack to be laser processed (drilled, cut, ablated, damaged or otherwise appreciably modified by the laser) is transparent to the laser wavelength. In one embodiment, the material to be processed by the laser is transparent to the laser wavelength if it absorbs less than 10% of the intensity of the laser wavelength per mm of thickness of the material. In another embodiment, the material to be processed by the laser is transparent to the laser wavelength if it absorbs less than 5% of the intensity of the laser wavelength per mm of thickness of the material. In still another, the material to be processed by the laser is transparent to the laser wavelength if it absorbs less than 2% of the intensity of the laser wavelength per mm of thickness of the material. In yet another embodiment, the material to be processed by the laser is transparent to the laser wavelength if it absorbs less than 1% of the intensity of the laser wavelength per mm of thickness of the material.

The selection of the laser source is further predicated on the ability to induce multi-photon absorption (MPA) in the transparent material. MPA is the simultaneous absorption of multiple photons of identical or different frequencies in order to excite a material from a lower energy state (usually the ground state) to a higher energy state (excited state). The excited state may be an excited electronic state or an ionized state. The energy difference between the higher and lower energy states of the material is equal to the sum of the energies of the two photons. MPA is a third-order nonlinear process that is several orders of magnitude weaker than linear absorption. It differs from linear absorption in that the strength of absorption depends on the square of the light intensity, thus making it a nonlinear optical process. At ordinary light intensities, MPA is negligible. If the light intensity (energy density) is extremely high, such as in the region of focus of a laser source (particularly a pulsed laser source), MPA becomes appreciable and leads to measurable effects in the material within the region where the energy density of the light source is sufficiently high. Within the focal region, the energy density may be sufficiently high to result in ionization.

At the atomic level, the ionization of individual atoms has discrete energy requirements. Several elements commonly used in glass (e.g., Si, Na, K) have relatively low ionization energies (~5 eV). Without the phenomenon of MPA, a wavelength of about 248 nm would be required to create linear ionization at ~5 eV. With MPA, ionization or excitation between states separated in energy by ~5 eV can be accomplished with wavelengths longer than 248 nm. For example, photons with a wavelength of 532 nm have an energy of ~2.33 eV, so two photons with wavelength 532 nm can induce a transition between states separated in energy by ~4.66 eV in two-photon absorption (TPA), for example.

Thus, atoms and bonds can be selectively excited or ionized in the regions of a material where the energy density of the laser beam is sufficiently high to induce nonlinear TPA of a laser wavelength having half the required excitation energy, for example. MPA can result in a local reconfiguration and separation of the excited atoms or bonds from adjacent atoms or bonds. The resulting modification in the bonding or configuration can result in non-thermal ablation and removal of matter from the region of the material in which MPA occurs. This removal of matter creates a structural defect (e.g. a defect line or "perforation") that mechanically weakens the material and renders it more susceptible to cracking or fracturing upon application of mechanical or thermal stress. By controlling the placement of perforations, a contour or path along which cracking occurs can be precisely defined and precise micromachining of the material can be accomplished. The contour defined by a series of perforations may be regarded as a fault line and corresponds to a region of structural weakness in the material. In one embodiment, micromachining includes separation of a part from the material processed by the laser, where the part has a precisely defined shape or perimeter determined by a closed contour of perforations formed through MPA effects induced by the laser. As used herein, the term closed contour refers to a perforation path formed by the laser line, where the path intersects with itself at some location. An internal contour is a path formed where the resulting shape is entirely surrounded by an outer portion of material.

Perforations can be accomplished with a single "burst" of high energy short duration pulses spaced close together in time. The laser pulse duration may be $10^{-10}$ s or less, or $10^{-11}$ s or less, or $10^{-12}$ s or less, or $10^{-13}$ s or less. These "bursts" may be repeated at high repetition rates (e.g. kHz or MHz). The perforations may be spaced apart and precisely positioned by controlling the velocity of a substrate or stack relative to the laser through control of the motion of the laser and/or the substrate or stack.

As an example, in a thin transparent substrate moving at 200 mm/sec exposed to a 100 kHz series of pulses, the individual pulses would be spaced 2 microns apart to create a series of perforations separated by 2 microns. This defect (perforation) spacing is sufficient close to allow for mechanical or thermal separation along the contour defined by the series of perforations.

Thermal Separation:

In some cases, a fault line created along a contour defined by a series of perforations or defect lines is not enough to separate the part spontaneously, and a secondary step may be necessary. If so desired, a second laser can be used to create thermal stress to separate it, for example. In the case of sapphire, separation can be achieved, after the creation of a fault line, by application of mechanical force or by using a thermal source (e.g., an infrared laser, for example a $CO_2$ laser) to create thermal stress and force a part to separate from a substrate. Another option is to have the $CO_2$ laser only start the separation and then finish the separation manually. The optional $CO_2$ laser separation can be achieved, for example, with a defocused continuous wave (cw) laser emitting at 10.6 µm and with power adjusted by controlling its duty cycle. Focus change (i.e., extent of defocusing up to and including focused spot size) is used to vary the induced thermal stress by varying the spot size. Defocused laser beams include those laser beams that produce a spot size larger than a minimum, diffraction-limited spot size on the order of the size of the laser wavelength. For example, spot sizes of about 7 mm, 2 mm and 20 mm can be used for $CO_2$ lasers, for example, whose emission wavelength is much smaller at 10.6 µm. Distance between adjacent defect lines 120 along the direction of the fault lines 110 can be greater than 0.5 µm and less than or equal to about 15 µm in some embodiments, for example.

Etching:

Acid etching can be used, for example, to separate a workpiece having a glass layer, for example. To enlarge the holes to a size useful for metal filling and electrical connections, parts can be acid etched. In one embodiment, for example, the acid used can be 10% $HF$/15% $HNO_3$ by volume. The parts can be etched for 53 minutes at a temperature of 24-25° C. to remove about 100 µm of material, for example. The parts can be immersed in this acid bath, and ultrasonic agitation at a combination of 40 kHz and 80 kHz frequencies can used to facilitate penetration of fluid and fluid exchange in the holes. In addition, manual agitation of the part within the ultrasonic field can be made to prevent standing wave patterns from the ultrasonic field from creating "hot spots" or cavitation related damage on the part. The acid composition and etch rate can be intentionally designed to slowly etch the part—a material removal rate of only 1.9 um/minute, for example. An etch rate of less than about 2 µm/minute, for example, allows acid to fully penetrate the narrow holes and agitation to exchange fresh fluid and remove dissolved material from the holes which are initially very narrow.

Figures 1, 3B:
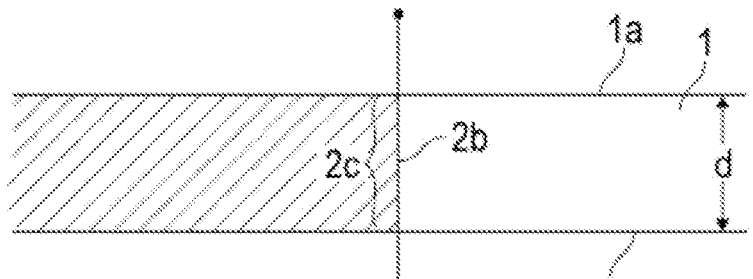

In the embodiment shown in FIG. 1, precise control of the depth of cut in a multilayer stack is achieved by inclusion of a beam disruption interface (labeled "modified interface"). The beam disruption interface prevents the laser radiation from interacting with portions of the multilayer stack beyond the position of the disruption interface.

In one embodiment, the beam disruption element is positioned immediately below the layer of the stack in which modification via two-photon absorption will occur. Such a configuration is shown in FIG. 1, where the beam disruption element is a modified interface positioned immediately below material A and material A is the material in which formation of perforations through the two-photon absorption mechanism described herein will occur. As used herein, reference to a position below or lower than another position assumes that the top or uppermost position is the surface of the multilayer stack upon which the laser beam is first incident. In FIG. 1, for example, the surface of material A that is closest to the laser source is the top surface and placement of the beam disruption element below material A means that the laser beam traverses material A before interacting with the beam disruption element.

The disruption element has different optical properties than the material to be cut. For example, the beam disruption element may be a defocusing element, a scattering element, a translucent element, or a reflective element. A defocusing element is an interface or a layer comprising a material that prevents the laser light from forming the laser beam focal line on or below the defocusing element. The defocusing element may be comprised of a material or interface with refractive index inhomogeneities that scatter or perturb the wavefront of the optical beam. A translucent element is an interface or layer of material that allows light to pass through, but only after scattering or attenuating the laser beam to lower the energy density sufficiently to prevent formation of a laser beam focal line in portions of the stack on the side of the translucent element that are remote from the laser beam. In one embodiment, the translucent element effects scattering or deviating of at least 10% of the light rays of the laser beam.

More specifically, the reflectivity, absorptivity, defocusing, attenuation, and/or scattering of the disruption element can be employed to create a barrier or impediment to the laser radiation. The laser beam disruption element can be created by several means. If the optical properties of the overall stack system are not of a concern, then one or more thin films can be deposited as a beam disruption layer(s) between the desired two layers of the stack, where the one or more thin films absorb, scatter, defocus, attenuate, reflects, and/or dissipates more of the laser radiation than the layer immediately above it to protect layers below the thin film(s) from receiving excessive energy density from the laser source. If the optical properties of the entire stack system do matter, the beam disruption element can be implemented as a notch filter. This can be done by several methods:

creating structures at the disruption layer or interface (e.g. via thin film growth, thin film patterning, or surface pattering) such that diffraction of incident laser radiation is at a particular wavelength or range of wavelengths occurs;

creating structures at the disruption layer or interface (e.g. via thin film growth, thin film patterning, or surface pattering) such that scattering of incident laser radiation occurs (e.g. a textured surface);

creating structures at the disruption layer or interface (e.g. via thin film growth, thin film patterning, or surface pattering) such that attenuated phase-shifting of laser radiation occurs; and creating a distributed Bragg reflector via thin-film stack at the disruption layer or interface to reflect only laser radiation.

It is not necessary that the absorption, reflection scattering, attenuation, defocusing etc. of the laser beam by the disruption element be complete. It is only necessary that the effect of the disruption element on the laser beam is sufficient to reduce the energy density or intensity of the focused laser beam to a level below the threshold required for cutting, ablation, perforating etc. of the layers in the stack protected by (underlying) the disruption element. In one embodiment, the disruption element reduces the energy density or intensity of the focused laser beam to a level below the threshold needed to induce two-photon absorption. The disruption layer or disruption interface may be configured to absorb, reflect, or scatter the laser beam, where the absorption, reflection, or scattering are sufficient to reduce the energy density or intensity of the laser beam transmitted to the carrier (or other underlying layer) to a level below the level needed to induce nonlinear absorption in the carrier or underlying layer.

Turning to FIGS. 2A and 2B, a method of laser drilling a material includes focusing a pulsed laser beam 2 into a laser beam focal line 2*b*, viewed along the beam propagation direction. Laser beam focal line 2*b* is a region of high energy density. As shown in FIG. 3, laser 3 (not shown) emits laser beam 2, which has a portion 2*a* incident to optical assembly 6. The optical assembly 6 turns the incident laser beam into an extensive laser beam focal line 2b on the output side over a defined expansion range along the beam direction (length l of the focal line).

Layer 1 is the layer of a multilayer stack in which internal modifications by laser processing and two-photon absorption is to occur. Layer 1 is a component of a larger workpiece, which typically includes a substrate or carrier upon which a multilayer stack is formed. Layer 1 is the layer within the multilayer stack in which holes, cuts, or other features are to be formed through two-photon absorption assisted ablation or modification as described herein. The layer 1 is positioned in the beam path to at least partially overlap the laser beam focal line 2b of laser beam 2. Reference 1a designates the surface of the layer 1 facing (closest or proximate to) the optical assembly 6 or the laser, respectively, reference 1b designates the reverse surface of layer 1 (the surface remote, or further away from, optical assembly 6 or the laser). The thickness of the layer 1 (measured perpendicularly to the planes 1a and 1b, i.e., to the substrate plane) is labeled with d.

As FIG. 2A depicts, layer 1 is aligned perpendicular to the longitudinal beam axis and thus behind the same focal line 2b produced by the optical assembly 6 (the substrate is perpendicular to the plane of the drawing). Viewed along the beam direction, the layer 1 is positioned relative to the focal line 2b in such a way that the focal line 2b (viewed in the direction of the beam) starts before the surface 1a of the layer 1 and stops before the surface 1b of the layer 1, i.e. focal line 2b terminates within the layer 1 and does not extend beyond surface 1b. In the overlapping area of the laser beam focal line 2b with layer 1, i.e. in the portion of layer 1 overlapped by focal line 2b, the extensive laser beam focal line 2b generates nonlinear absorption in layer 1. (Assuming suitable laser intensity along the laser beam focal line 2b, which intensity is ensured by adequate focusing of laser beam 2 on a section of length l (i.e. a line focus of length l), which defines an extensive section 2c (aligned along the longitudinal beam direction) along which an induced nonlinear absorption is generated in the layer 1.) The induced nonlinear absorption results in formation of a defect line or crack in layer 1 along section 2c. The defect or crack formation is not only local, but rather may extend over the entire length of the extensive section 2c of the induced absorption. The length of section 2c (which corresponds to the length of the overlapping of laser beam focal line 2b with layer 1) is labeled with reference L. The average diameter or extent of the section of the induced absorption 2c (or the sections in the material of layer 1 undergoing the defect line or crack formation) is labeled with reference D. This average extent D basically corresponds to the average diameter δ of the laser beam focal line 2b, that is, an average spot diameter in a range of between about 0.1 μm and about 5 μm.

As FIG. 2A shows, the layer 1 (which is transparent to the wavelength λ of laser beam 2) is locally heated due to the induced absorption along the focal line 2b. The induced absorption arises from the nonlinear effects associated with the high intensity (energy density) of the laser beam within focal line 2b. FIG. 2B illustrates that the heated layer 1 will eventually expand so that a corresponding induced tension leads to micro-crack formation, with the tension being the highest at surface 1a.

Representative optical assemblies 6, which can be applied to generate the focal line 2b, as well as a representative optical setup, in which these optical assemblies can be applied, are described below. All assemblies or setups are based on the description above so that identical references are used for identical components or features or those which are equal in their function. Therefore only the differences are described below.

To insure high quality (regarding breaking strength, geometric precision, roughness and avoidance of re-machining requirements) of the surface of separation after cracking along the contour defined by the series of perforations, the individual focal lines used to form the perforations that define the contour of cracking should be generated using the optical assembly described below (hereinafter, the optical assembly is alternatively also referred to as laser optics). The roughness of the separated surface is determined primarily by the spot size or the spot diameter of the focal line. A roughness of a surface can be characterized, for example, by an Ra surface roughness statistic (roughness arithmetic average of absolute values of the heights of the sampled surface). In order to achieve a small spot size of, for example, 0.5 μm to 2 μm in case of a given wavelength λ of laser 3 (interaction with the material of layer 1), certain requirements must usually be imposed on the numerical aperture of laser optics 6. These requirements are met by laser optics 6 described below.

In order to achieve the required numerical aperture, the optics must, on the one hand, dispose of the required opening for a given focal length, according to the known Abbé formulae (N.A.=n sin (theta), n: refractive index of the material to be processed, theta: half the aperture angle; and theta=arctan (D/2f); D: aperture, f: focal length). On the other hand, the laser beam must illuminate the optics up to the required aperture, which is typically achieved by means of beam widening using widening telescopes between the laser and focusing optics.

The spot size should not vary too strongly for the purpose of a uniform interaction along the focal line. This can, for example, be ensured (see the embodiment below) by illuminating the focusing optics only in a small, circular area so that the beam opening and thus the percentage of the numerical aperture only vary slightly.

According to FIG. 3A (section perpendicular to the substrate plane at the level of the central beam in the laser beam bundle of laser radiation 2; here, too, laser beam 2 is perpendicularly incident to the layer 1, i.e. incidence angle β is 0° so that the focal line 2b or the extensive section of the induced absorption 2c is parallel to the substrate normal), the laser radiation 2a emitted by laser 3 is first directed onto a circular aperture 8 which is completely opaque to the laser radiation used. Aperture 8 is oriented perpendicular to the longitudinal beam axis and is centered on the central beam of the depicted beam bundle 2a. The diameter of aperture 8 is selected in such a way that the beam bundles near the center of beam bundle 2a or the central beam (here labeled with 2aZ) hit the aperture and are completely blocked by it. Only the beams in the outer perimeter range of beam bundle 2a (marginal rays, here labeled with 2aR) are not blocked due to the reduced aperture size compared to the beam diameter, but pass aperture 8 laterally and hit the marginal areas of the focusing optic elements of the optical assembly 6, which, in this embodiment, is designed as a spherically cut, bi-convex lens 7.

Lens 7 is centered on the central beam and is designed as a non-corrected, bi-convex focusing lens in the form of a common, spherically cut lens. The spherical aberration of such a lens may be advantageous. As an alternative, aspheres or multi-lens systems deviating from ideally corrected systems, which do not form an ideal focal point but a distinct, elongated focal line of a defined length, can also be used (i.e., lenses or systems which do not have a single focal point). The zones of the lens thus focus along a focal line 2b, subject to the distance from the lens center. The diameter of aperture 8 across the beam direction is approximately 90% of the diameter of the beam bundle (defined by the distance required for the intensity of the beam to decrease to 1/e of the peak intensity) and approximately 75% of the diameter of the lens of the optical assembly 6. The focal line 2b of a non-aberration-corrected spherical lens 7 generated by blocking out the beam bundles in the center is thus used. FIG. 3A shows the section in one plane through the central beam, the complete three-dimensional bundle can be seen when the depicted beams are rotated around the focal line 2b.

One potential disadvantage of this type of focal line is that the conditions (spot size, laser intensity) may vary along the focal line (and thus along the desired depth in the material) and therefore the desired type of interaction (no melting, induced absorption, thermal-plastic deformation up to crack formation) may possibly occur only in selected portions of the focal line. This means in turn that possibly only a part of the incident laser light is absorbed by the material to be processed in the desired way. In this way, the efficiency of the process (required average laser power for the desired separation speed) may be impaired, and the laser light may also be transmitted into undesired regions (parts or layers adherent to the substrate or the substrate holding fixture) and interact with them in an undesirable way (e.g. heating, diffusion, absorption, unwanted modification).

Figures 2, 3B:
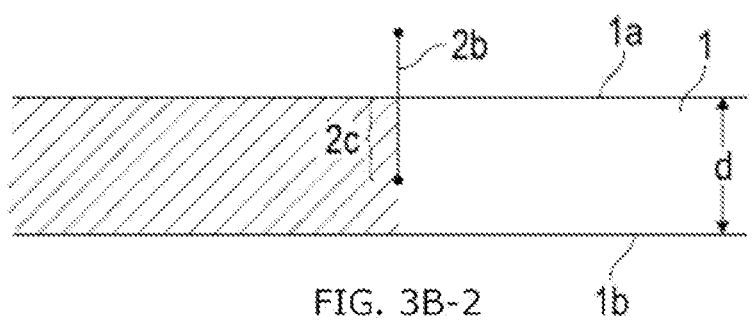
Figures 3, 3B:
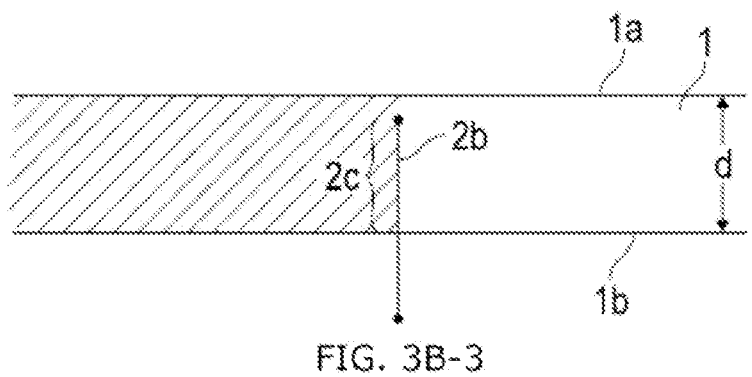
Figures 3, 3B, 4:
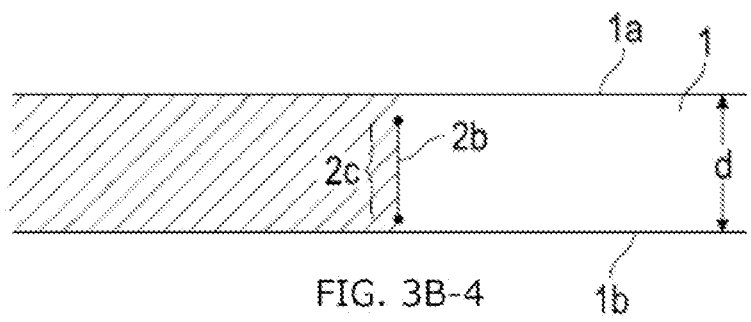
Figure 4:
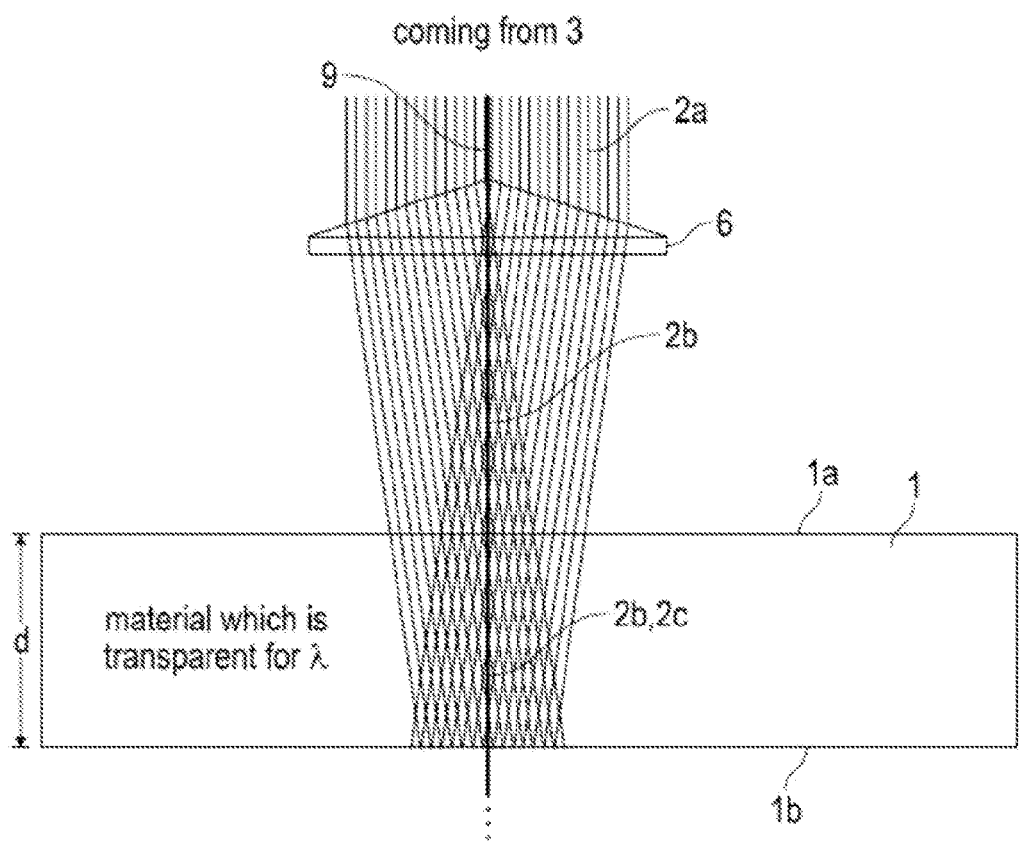

FIG. 3B-1-4 show (not only for the optical assembly in FIG. 3A, but also for any other applicable optical assembly 6) that the position of laser beam focal line 2b can be controlled by suitably positioning and/or aligning the optical assembly 6 relative to layer 1 as well as by suitably selecting the parameters of the optical assembly 6: As FIG. 3B-1 illustrates, the length l of the focal line 2b can be adjusted in such a way that it exceeds the layer thickness d (here by factor 2). If layer 1 is placed (viewed in longitudinal beam direction) centrally to focal line 2b, an extensive section of induced absorption 2c is generated over the entire substrate thickness.

In the case shown in FIG. 3B-2, a focal line 2b of length l is generated which corresponds more or less to the layer thickness d. Since layer 1 is positioned relative to line 2b in such a way that line 2b starts at a point outside the material to be processed, the length L of the section of extensive induced absorption 2c (which extends here from the substrate surface to a defined substrate depth, but not to the reverse surface 1b) is smaller than the length l of focal line 2b. FIG. 3B-3 shows the case in which the substrate 1 (viewed along the beam direction) is positioned above the starting point of focal line 2b so that, as in FIG. 3B-2, the length l of line 2b is greater than the length L of the section of induced absorption 2c in layer 1. The focal line thus starts within the layer 1 and extends beyond the reverse surface 1b. FIG. 3B-4 shows the case in which the focal line length l is smaller than the layer thickness d so that—in the case of a central positioning of the substrate relative to the focal line viewed in the direction of incidence—the focal line starts near the surface 1a within the layer 1 and ends near the surface 1b within the layer 1 (e.g. l=0.75·d). The laser beam focal line 2b can have a length l in a range of between about 0.1 mm and about 100 mm or in a range of between about 0.1 mm and about 10 mm, for example. Various embodiments can be configured to have length l of about 0.1 mm, 0.2 mm, 0.3 mm, 0.4 mm, 0.5 mm, 0.7 mm, 1 mm, 2 mm, 3 mm or 5 mm, for example.

It is particularly advantageous to position the focal line 2b in such a way that at least one of surfaces 1a, 1b is covered by the focal line, so that the section of induced nonlinear absorption 2c starts at least on one surface of the layer or material to be processed. In this way it is possible to achieve virtually ideal cuts while avoiding ablation, feathering and particulation at the surface.

FIG. 4 depicts another applicable optical assembly 6. The basic construction follows the one described in FIG. 3A so that only the differences are described below. The depicted optical assembly is based the use of optics with a non-spherical free surface in order to generate the focal line 2b, which is shaped in such a way that a focal line of defined length l is formed. For this purpose, aspheres can be used as optic elements of the optical assembly 6. In FIG. 4, for example, a so-called conical prism, also often referred to as axicon, is used. An axicon is a special, conically cut lens which forms a spot source on a line along the optical axis (or transforms a laser beam into a ring). The layout of such an axicon is principally known to those of skill in the art; the cone angle in the example is 10°. The apex of the axicon labeled here with reference 9 is directed towards the incidence direction and centered on the beam center. Since the focal line 2b produced by the axicon 9 starts within its interior, layer 1 (here aligned perpendicularly to the main beam axis) can be positioned in the beam path directly behind axicon 9. As FIG. 4 shows, it is also possible to shift layer 1 along the beam direction due to the optical characteristics of the axicon while remaining within the range of focal line 2b. The section of extensive induced absorption 2c in the material of layer 1 therefore extends over the entire depth d.

However, the depicted layout is subject to the following restrictions: Since the region of focal line 2b formed by axicon 9 begins within the axicon 9, a significant part of the laser energy is not focused into the section of induced absorption 2c of focal line 2b, which is located within the material, in the situation where there is a separation between axicon 9 and the material to be processed. Furthermore, length l of focal line 2b is related to the beam diameter through the refractive indices and cone angles of axicon 9. This is why, in the case of relatively thin materials (several millimeters), the total focal line is much longer than the thickness of the material to be processed, having the effect that much of the laser energy is not focused into the material.

Figure 5A:
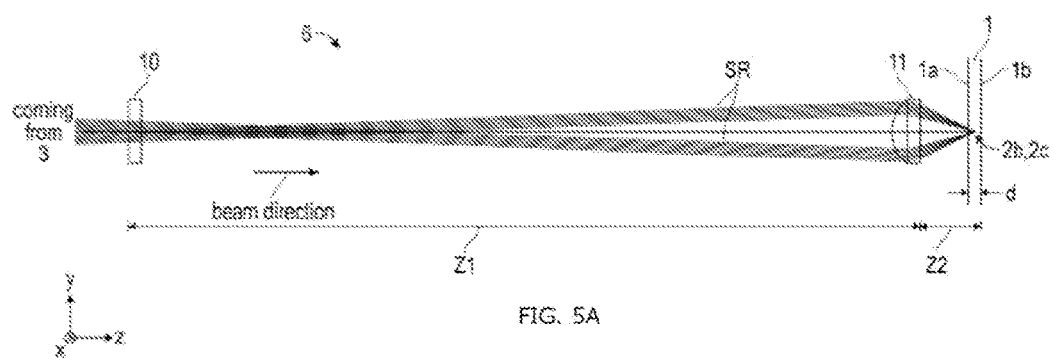
FIGS. 5A and 5B are illustrations of a third optical assembly for laser drilling according to an embodiment.

For this reason, it may be desirable to use an optical assembly 6 that includes both an axicon and a focusing lens. FIG. 5A depicts such an optical assembly 6 in which a first optical element (viewed along the beam direction) with a non-spherical free surface designed to form an extensive laser beam focal line 2b is positioned in the beam path of laser 3. In the case shown in FIG. 5A, this first optical element is an axicon 10 with a cone angle of 5°, which is positioned perpendicularly to the beam direction and centered on laser beam 3. The apex of the axicon is oriented towards the beam direction. A second, focusing optical element, here the plano-convex lens 11 (the curvature of which is oriented towards the axicon), is positioned in the beam direction at a distance z1 from the axicon 10. The distance z1, in this case approximately 300 mm, is selected in such a way that the laser radiation formed by axicon 10 is circularly incident on the outer radial portion of lens 11. Lens 11 focuses the circular radiation on the output side at a distance z2, in this case approximately 20 mm from lens 11, on a focal line 2b of a defined length, in this case 1.5 mm. The effective focal length of lens 11 is 25 mm in this embodiment. The circular transformation of the laser beam by axicon 10 is labeled with the reference SR.

Figure 5B:
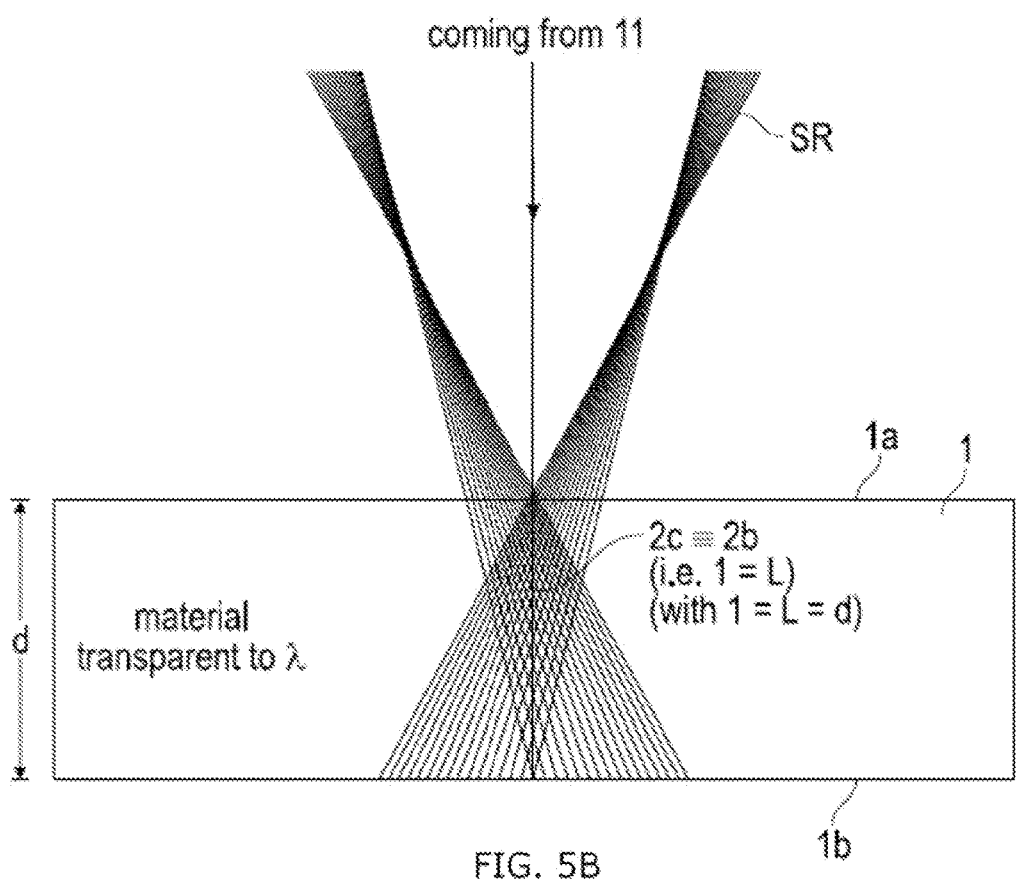

FIG. 5B depicts the formation of the focal line 2b or the induced absorption 2c in the material of layer 1 according to FIG. 5A in detail. The optical characteristics of both elements 10, 11 as well as the positioning of them is selected in such a way that the length l of the focal line 2b in beam direction is exactly identical with the thickness d of layer 1. Consequently, an exact positioning of layer 1 along the beam direction is required in order to position the focal line 2b exactly between the two surfaces 1a and 1b of layer 1, as shown in FIG. 5B.

It is therefore advantageous if the focal line is formed at a certain distance from the laser optics, and if the greater part of the laser radiation is focused up to a desired end of the focal line. As described, this can be achieved by illuminating a primarily focusing element 11 (lens) only circularly (annularly) over a particular outer radial region, which, on the one hand, serves to realize the required numerical aperture and thus the required spot size, and, on the other hand, however, the circle of diffusion diminishes in intensity after the required focal line 2b over a very short distance in the center of the spot, as a basically circular spot is formed. In this way, the crack formation is stopped within a short distance in the required substrate depth. A combination of axicon 10 and focusing lens 11 meets this requirement. The axicon acts in two different ways: due to the axicon 10, a usually round laser spot is sent to the focusing lens 11 in the form of a ring, and the asphericity of axicon 10 has the effect that a focal line is formed beyond the focal plane of the lens instead of a focal point in the focal plane. The length l of focal line 2b can be adjusted via the beam diameter on the axicon. The numerical aperture along the focal line, on the other hand, can be adjusted via the distance z1 axicon-lens and via the cone angle of the axicon. In this way, the entire laser energy can be concentrated in the focal line.

If the crack formation is intended to continue to the back side of the layer or material to be processed, the circular (annular) illumination still has the advantage that (1) the laser power is used optimally in the sense that most of the laser light remains concentrated in the required length of the focal line, and (2) it is possible to achieve a uniform spot size along the focal line—and thus a uniform separation process along the perforations produced by the focal lines—due to the circularly illuminated zone in conjunction with the desired aberration set by means of the other optical functions.

Instead of the plano-convex lens depicted in FIG. 5A, it is also possible to use a focusing meniscus lens or another higher corrected focusing lens (asphere, multi-lens system).

In order to generate very short focal lines 2b using the combination of an axicon and a lens depicted in FIG. 5A, it would be necessary to select a very small beam diameter of the laser beam incident on the axicon. This has the practical disadvantage that the centering of the beam onto the apex of the axicon must be very precise and that the result is very sensitive to directional variations of the laser (beam drift stability). Furthermore, a tightly collimated laser beam is very divergent, i.e. due to the light deflection the beam bundle becomes blurred over short distances.

Figure 6:
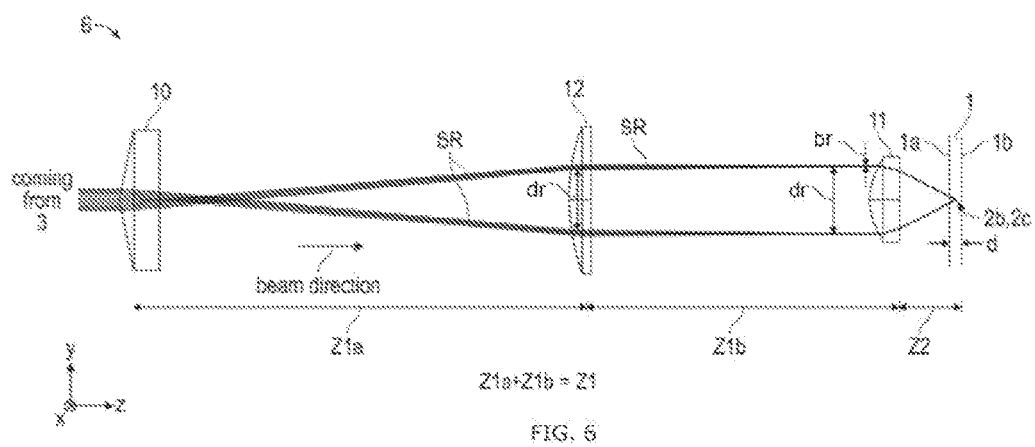
FIG. 6 is a schematic illustration of a fourth optical assembly for laser processing according to an embodiment.

As shown in FIG. 6, both effects can be avoided by including another lens, a collimating lens 12 in the optical assembly 6. The additional positive lens 12 serves to adjust the circular illumination of focusing lens 11 very tightly. The focal length f' of collimating lens 12 is selected in such a way that the desired circle diameter dr results from distance z1a from the axicon to the collimating lens 12, which is equal to f'. The desired width br of the ring can be adjusted via the distance z1b (collimating lens 12 to focusing lens 11). As a matter of pure geometry, the small width of the circular illumination leads to a short focal line. A minimum can be achieved at distance f'.

The optical assembly 6 depicted in FIG. 6 is thus based on the one depicted in FIG. 5A so that only the differences are described below. The collimating lens 12, here also designed as a plano-convex lens (with its curvature towards the beam direction) is additionally placed centrally in the beam path between axicon 10 (with its apex towards the beam direction), on the one side, and the plano-convex lens 11, on the other side. The distance of collimating lens 12 from axicon 10 is referred to as z1a, the distance of focusing lens 11 from collimating lens 12 as z1b, and the distance of the focal line 2b from the focusing lens 11 as z2 (always viewed in beam direction). As shown in FIG. 6, the circular radiation SR formed by axicon 10, which is incident divergently and under the circle diameter dr on the collimating lens 12, is adjusted to the required circle width br along the distance z1b for an at least approximately constant circle diameter dr at the focusing lens 11. In the case shown, a very short focal line 2b is intended to be generated so that the circle width br of approx. 4 mm at lens 12 is reduced to approx. 0.5 mm at lens 11 due to the focusing properties of lens 12 (circle diameter dr is 22 mm in the example).

In the depicted example it is possible to achieve a length of the focal line 1 of less than 0.5 mm using a typical laser beam diameter of 2 mm, a focusing lens 11 with a focal length f=25 mm, a collimating lens with a focal length f'=150 mm, and choosing distances Z1a=Z1b=140 mm and Z2=15 mm.

Figure 7:
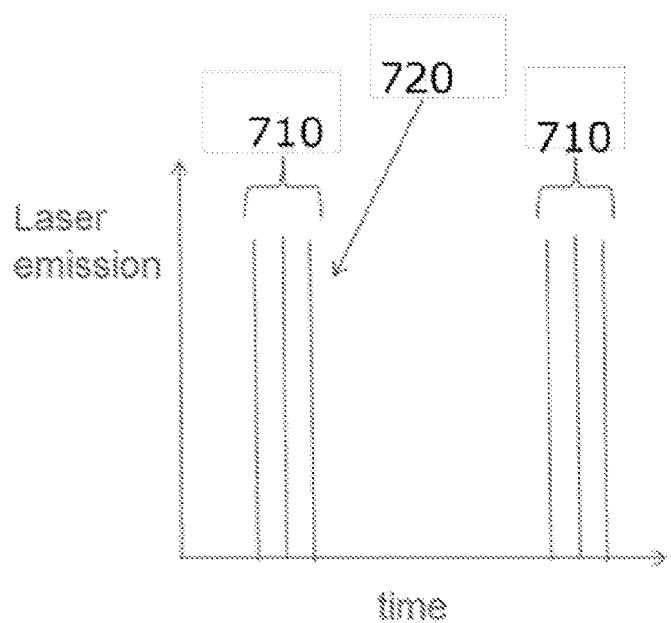
FIG. 7 is a graph of laser emission as a function of time for a picosecond laser according to an embodiment, where each emission is characterized by a pulse "burst" which may contain one or more sub-pulses, the frequency of the bursts is the repetition rate of the laser, typically about 100 kHz (10 μsec), and the time between sub-pulses is much shorter, e.g., about 20 nanoseconds (nsec)

Note that, as shown in FIG. 7, the typical operation of such a picosecond laser creates a "burst" 710 of pulses 720. Each "burst" 710 may contain multiple pulses 720 (such as 2 pulses, 3 pulses as shown in FIG. 7, 4 pulses, 5 pulses or more) of very short duration (~10 psec). Each pulse 720 is separated in time by a duration in a range of between about 1 nsec and about 50 nsec, such as approximately 20 nsec (50 MHz), with the time often governed by the laser cavity design. The time between each "burst" 710 will be much longer, often about 10 μsec, for a laser repetition rate of about 100 kHz. The exact timings, pulse durations, and repetition rates can vary depending on the laser design, but short pulses (i.e., less than about 15 psec) of high intensity have been shown to work well with this technique.

Figure 8:
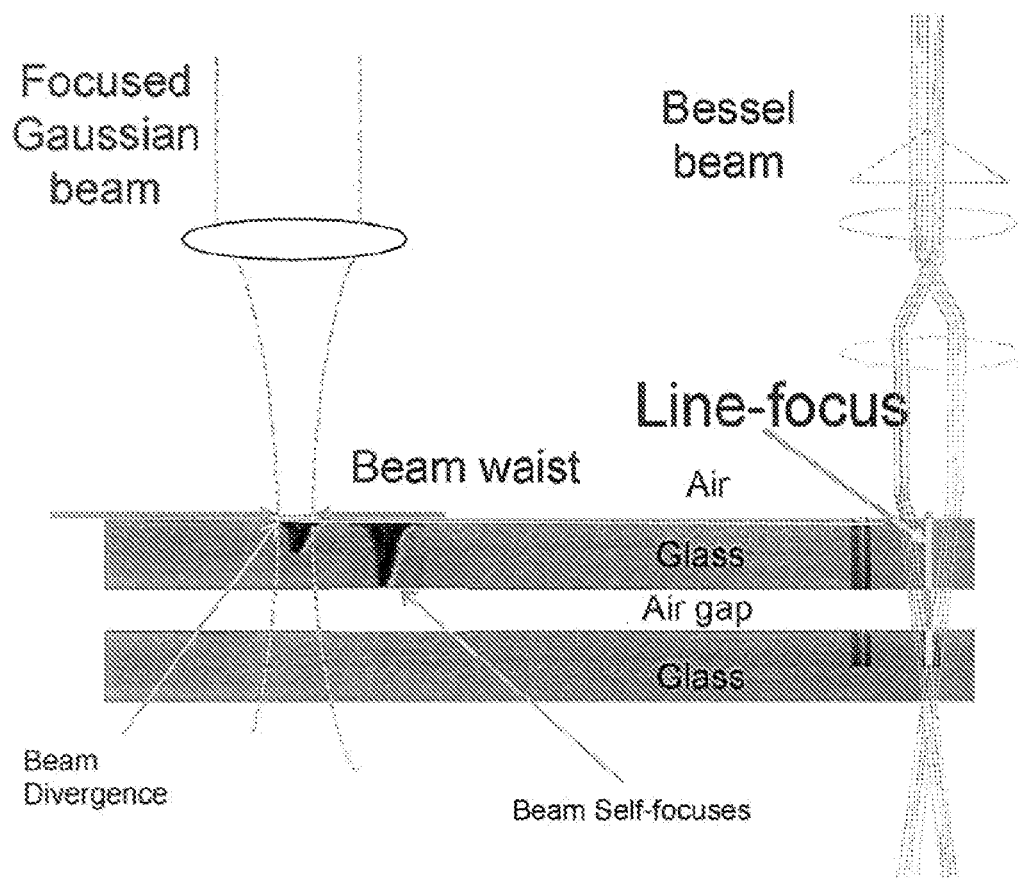
FIG. 8 is a comparison between a focused Gaussian beam and a Bessel beam incident upon a glass-air-glass composite structure.

FIG. 8 shows the contrast between a focused Gaussian beam and a Bessel beam incident upon a glass-air-glass composite structure. A focused Gaussian beam will diverge upon entering the first glass layer and will not drill to large depths, or if self-focusing occurs as the glass is drilled, the beam will emerge from the first glass layer and diffract, and will not drill into the second glass layer. In contrast, a Bessel beam will drill both glass layers over the full extent of the line focus. An example of a glass-air-glass composite structure cut with a Bessel beam is shown in the inset photograph in FIG. 8, which shows a side view of the exposed cut edges. The top and bottom glass pieces are 0.4 mm thick 2320, CT101. The exemplary air gap between two layers of glass is ~400 μm. The cut was made with a single pass of the laser at 200 mm/sec, so that the two pieces of glass were cut simultaneously, even though they were separated by >400 μm.

In some of the embodiments described herein, the air gap is between 50 μm and 5 mm, for example is between 50 μm and 2 mm, or between 200 μm and 2 mm.

Figure 9:
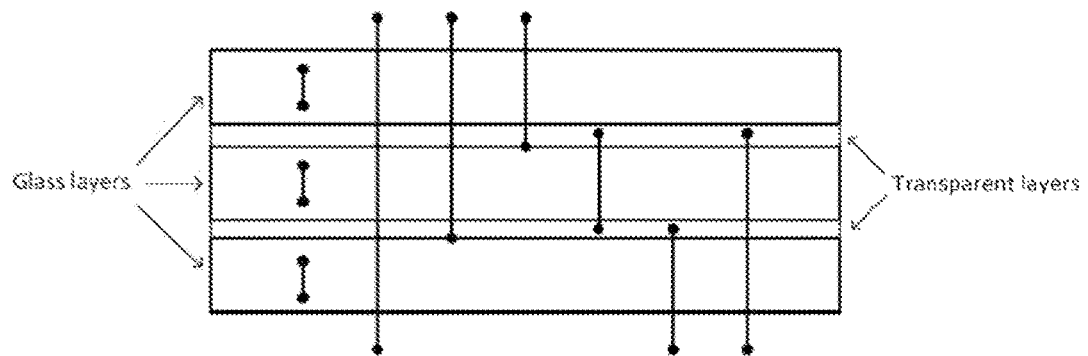
FIG. 9 is an illustration of stacking with transparent protective layers to cut multiple sheets while reducing abrasion or contamination according to an embodiment.

Exemplary disruption layers include polyethylene plastic sheeting (e.g., Visqueen® brand). Transparent layers, as shown in FIG. 9, include transparent vinyl (e.g., Penstick brand). Note that unlike with other focused laser methods, to get the effect of a blocking or stop layer, the exact focus does not need to be precisely controlled, nor does the material of the disruption layer need to be particularly durable or expensive. In many applications, one just needs a layer that interferes with the laser light slightly to disrupt the laser light and prevent line focus from occurring. The fact that Visqueen prevents cutting with the picosecond laser and line focus is a perfect example—other focused picosecond laser beams will most certainly drill right through the Visqueen, and one wishing to avoid drilling right through such a material with other laser methods one would have to very precisely set the laser focus to not be near the Visqueen.

Figure 10:
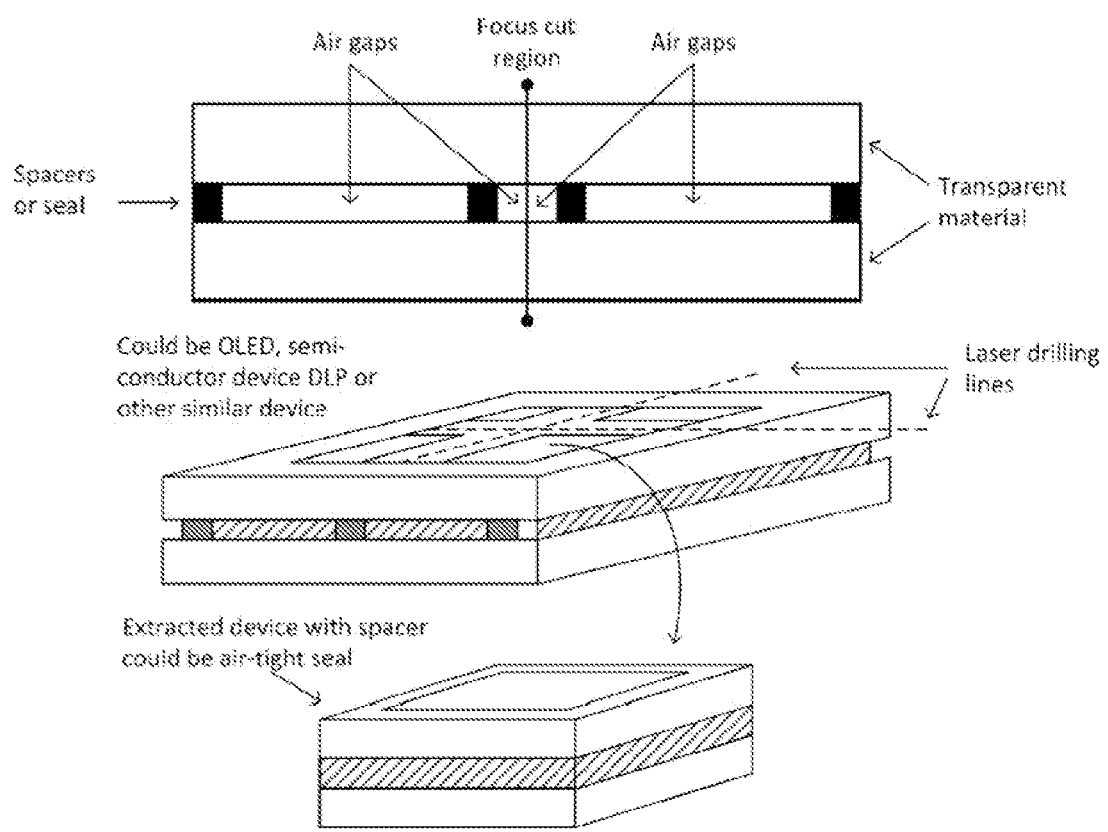
FIG. 10 is an illustration of an air gap and cutting of encapsulated devices according to an embodiment.

FIG. 10 shows stacking with transparent protective layers to cut multiple sheets while reducing abrasion or contamination. Simultaneously cutting a stack of display glass sheets is very advantageous. A transparent polymer such as vinyl can be placed between the glass sheets. The transparent polymer layers serve as protective layers serve to reduce damage to the glass surfaces which are in close contact with one another. These layers would allow the cutting process to work, but would protect the glass sheets from scratching one another, and would furthermore prevent any cutting debris (albeit it is small with this process) from contaminating the glass surfaces. The protective layers can also be comprised of evaporated dielectric layers deposited on the substrates or glass sheets.

Figure 11:
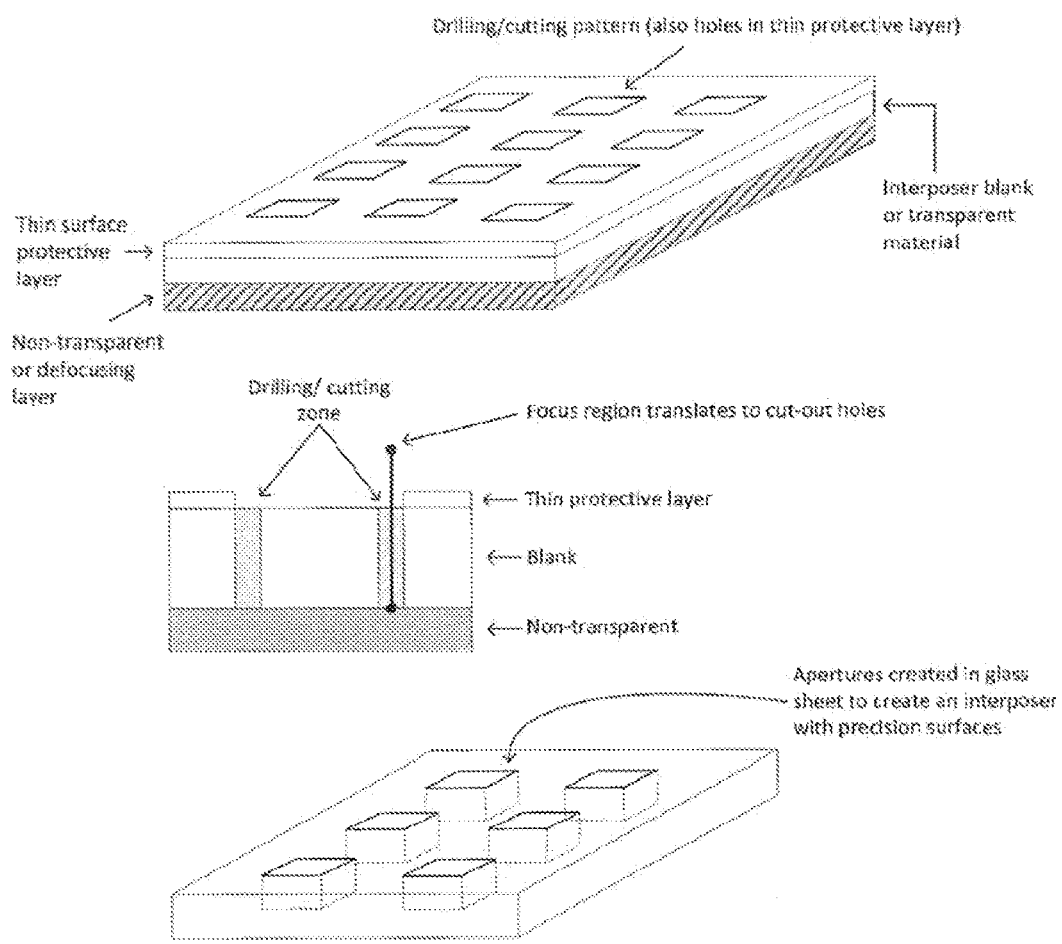
FIG. 11 is an illustration of cutting of interposers or windows with laser perforation then etch or laser perforation and $CO_2$ laser release according to an embodiment.

FIG. 11 shows air gap and cutting of encapsulated devices. This line focus process can simultaneously cut through stacked glass sheets, even if a significant macroscopic air gap is present. This is not possible with other laser methods, as illustrated in FIG. 8. Many devices require glass encapsulation, such as OLEDs (organic light emitting diode). Being able to cut through the two glass layers simultaneously is very advantageous for a reliable and efficient device segmentation process. Segmented means one component can be separated from a larger sheet of material that may contain a plurality of other components. Other components that can be segmented, cut out, or produced by the methods described herein are, for example, OLED (organic light emitting diode) components, DLP (digital light processor) components, an LCD (liquid crystal display) cells, semiconductor device substrates.

Figure 12:
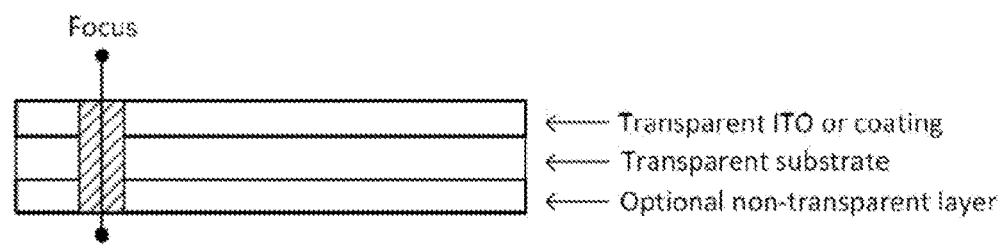
FIG. 12 is an illustration of cutting an article such as electrochromic glass coated with transparent conductive layers (e.g. indium tin oxide (ITO)) according to an embodiment.

FIG. 12 shows cutting an article such as electrochromic glass coated with transparent conductive layers (e.g. ITO). Cutting glass that already has transparent conducting layers such as indium tin oxide (ITO) is of high value for electrochromic glass applications and also touch panel devices. This laser process can cut through such layers with minimal damage to the transparent conductive layer and very little debris generation. The extremely small size of the perforated holes (<5 um) means that very little of the ITO will be affected by the cutting process, whereas other cutting methods are going to generate far more surface damage and debris.

Figure 13:
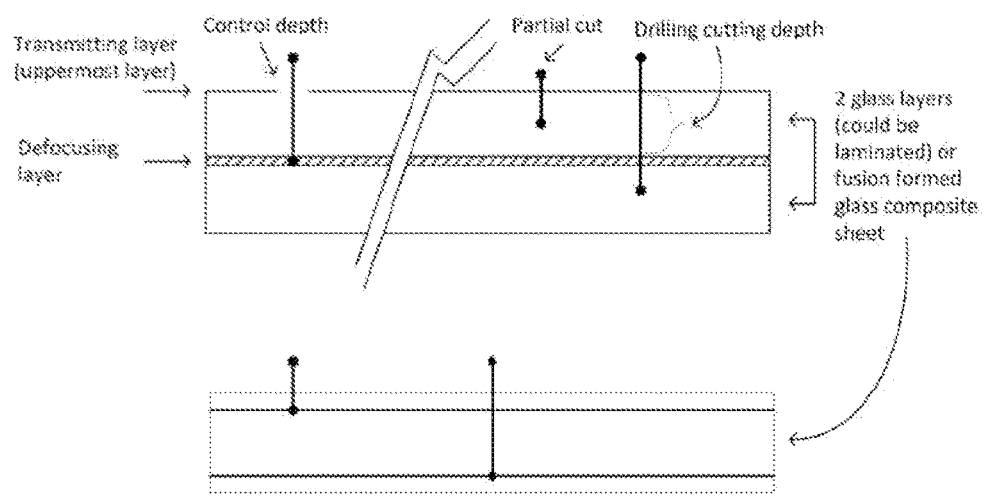
FIG. 13 is an illustration of precision cutting of some layers in a stack while not damaging others according to an embodiment.

FIG. 13 shows precision cutting of some layers in a stack while not damaging others, as also shown in FIG. 1, extending the concept to multiple layers (i.e., more than two layers). In the embodiment of FIG. 13, the disruption element is a defocusing layer.

Figures 14A, 14B:
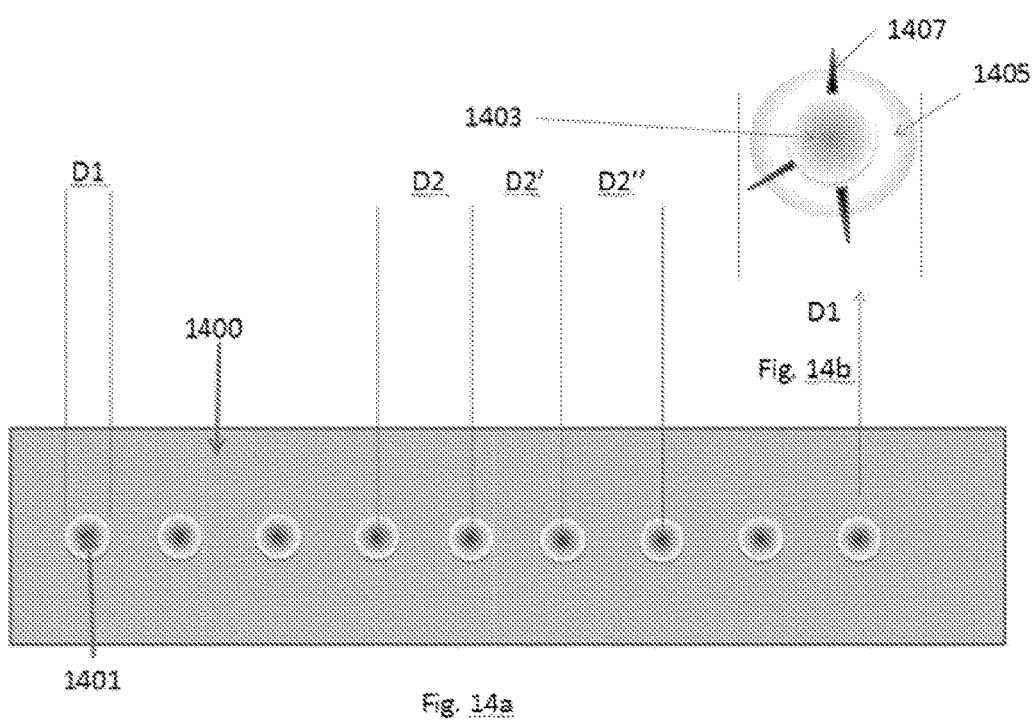
FIG. 14a is a schematic top view representation of perforations formed in a glass substrate according to an embodiment.
FIG. 14b is a magnified view of D1 shown in FIG. 14a showing the local damage site with the perforation, the stress field and all micro cracks in a glass substrate according to an embodiment.

FIG. 14a shows a schematic top view representation of perforations 1401 formed in a glass substrate 1400 within a heat damaged zone (or heat affected zone) 1403 (see FIG. 14b). The perforations preferably extend through the thickness of the glass (but do not have to), can have a particular diameter based on the laser pulse energy, for example, and can be formed by the laser assembly attached to an optical assembly (or by other laser assemblies as may be known or developed that can form such perforations). The laser assembly and optical assembly can have certain predetermined characteristics and functionalities of any and all of the embodiments described herein above, can be preprogrammed and controlled by a controller 1508 as described below, and can preferably provide a single 10 picosecond laser pulse emission (ultra-short pulse laser ablation) to form a defect/perforation along a focal line. The perforations 1401 can be created on draw, when the glass substrate is hot or can be done after draw at ambient temperature. The perforations 1401 are shown surrounded by a stress field 1405 including micro cracks 1407 with various lengths (which can be the same length or different lengths). The distance D1 includes the perforation 1401, the stress field 1405 and all micro cracks 1407 (preferably extends to the end of the longest micro crack). FIG. 14b shows a magnified view of D1 showing the local damage site with the perforation 1401, the stress field 1405 and all micro cracks 1407. D2 is shown as the distance between two perforations 1401, preferably as measured by the center of the perforations 1401. During creation of the perforations, it is understood that a perforation may not be perfectly lined up and may not have the same diameter (but can have the same diameter and can be lined up) with an adjacent perforation; however, D2 can still be measured.

FIG. 15a shows a laser assembly connected to an optical assembly (roughly shown as a combination at 1505), a moving apparatus 1507 connected to the laser assembly and optical assembly, and a controller 1508 above a side view showing the interface of a glass substrate 1400. This figure illustrates the point that these two assemblies (laser and optical) can be attached to the moving apparatus 1507 that is configured to move the laser assembly and optical assembly 1505 with respect to the glass substrate 1400 along the x-axis 1501, the z-axis 1503, and the y-axis (which in FIG. 15a is into and out of the page). The controller 1508 can be preprogrammed to control 1511 all movements and functionalities described herein and above with respect to (and communicate with) the laser assembly and/or optical assembly 1505. The controller 1508 can also be preprogrammed to control 1509 all movements and functionalities (and communicate with) of the moving apparatus 1507. Together, the control and communication programming and corresponding functionalities of the controller 1508 allows the controller 1508 to control these system components to execute instructions representing a predetermined design to create the predetermined design (which can include, but is not limited to, the size of D1 and D2, among other designs described herein). Similar to FIG. 14b, FIG. 15b shows a magnified side view D1 with the perforation 1401, the stress field 1405, and all micro cracks 1407.

Figure 15C:
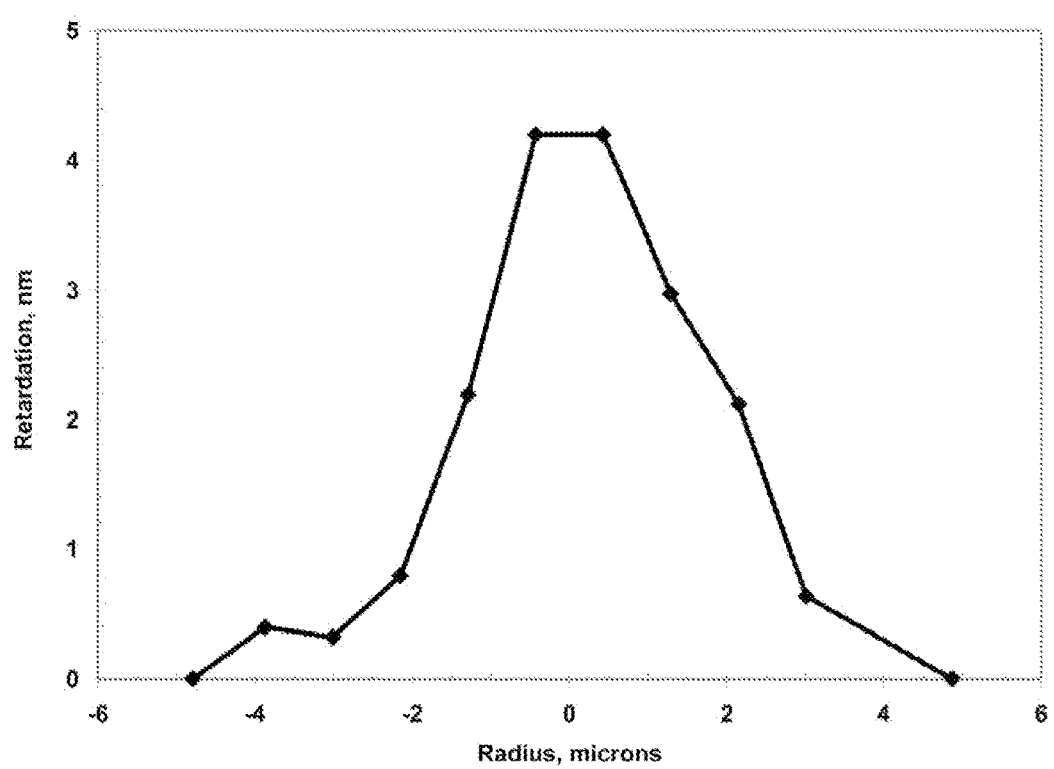
FIG. 15c is an illustrates of birefringence (retardation (nm),) due to the stress as function of distance from center of the perforation (x-axis).

FIG. 15c corresponds to FIG. 15b and shows birefringence (retardation (nm), y-axis) due to the stress as function of distance from center of the perforation (x-axis). This stress extends, in this exemplary embodiment, +/−5 μm from the center of perforation. The highest value indicates highest stress due to the laser induced damage.

Figure 15D:
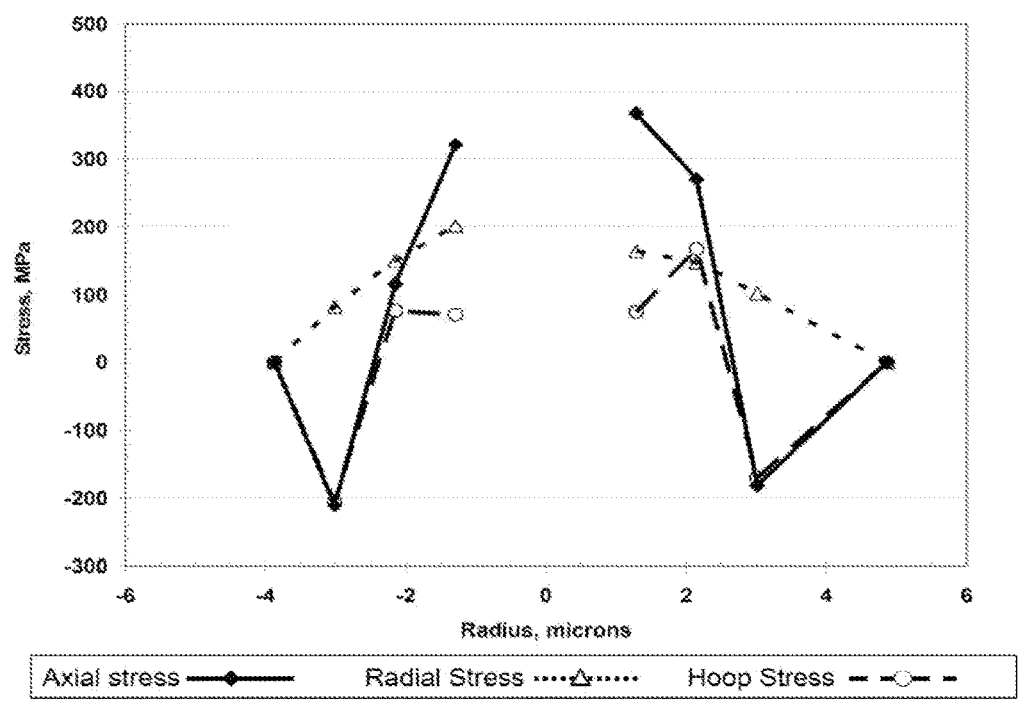
FIG. 15d corresponds to FIG. 15c and illustrates stress values as function of distance from center of the perforation (x-axis).

This birefringence graph can be converted to stress values as shown in FIG. 15d, which shows stress (MPa) vs. location relative to the center of the perforation. Three stress field can be shown" axial stress, radial stress, and hoop stress. The tensile stress is the highest in the center of the perforation and, for example, exceeds 100 MPa. Any crack reaching this location will propagate to the center of the perforation. The size of stress field and cracks size can be adjusted depending on processing conditions. The data in FIG. 15d is provided starting at about +/−1 μm from the center of perforation.

The transmission/transfer of data, control signals, and communication signals between the controller 1508, and the laser assembly and/or optical assembly 1505, and the moving apparatus 1507 can be implemented over a network, which can be any suitable wired or wireless network capable of transmitting communication, including but not limited to a telephone network, Internet, Intranet, local area network, Ethernet, online communication, offline communications, wireless communications and/or similar communications means. The wireless transmission can be accomplished through any wireless protocol/technology, including, but not limited to, ZigBee standards-based protocol, Bluetooth technology, and/or Wi-Fi technology. The controller 1508 can be located in the same room, in a different room in the same building, in a completely different building and location from the laser assembly and/or optical assembly 1505 and the moving apparatus 1507.

The controller 1508 can be programmed to control the laser assembly and/or optical assembly 1505 and/or the moving apparatus 1507 to form perforations 1401 of a particular size, thus forming a particular sized D1 (which can be the same or different in size as compared to a subsequent D1). It is preferable that information such as glass substrate composition/type, size (length, width, and depth) be part of the programming. From the measurement of D1, a "crack length" can be determined, which is defined as D1/2. Further, controller 1508 can be programmed to control the laser assembly and/or optical assembly 1505 and the moving apparatus 1507 to form subsequent perforations separated by a particular distance D2, D2', and D2", where each of D2, D2', and D2" can be the same distance or different distances as compared to each other.

As described herein, the relative interface fracture toughness can be tuned by changing the values of D1 (and hence, crack length which equals D1/2) and D2. To provide a glass substrate with a lowered relative interface fracture toughness, the controller 1508 can be programmed to create optimally sized crack lengths (D1/2) and optimally spaced-apart perforations (D2, D2' etc.) along an interface defining a contour (in accordance with the advantages discussed, supra).

Figure 16:
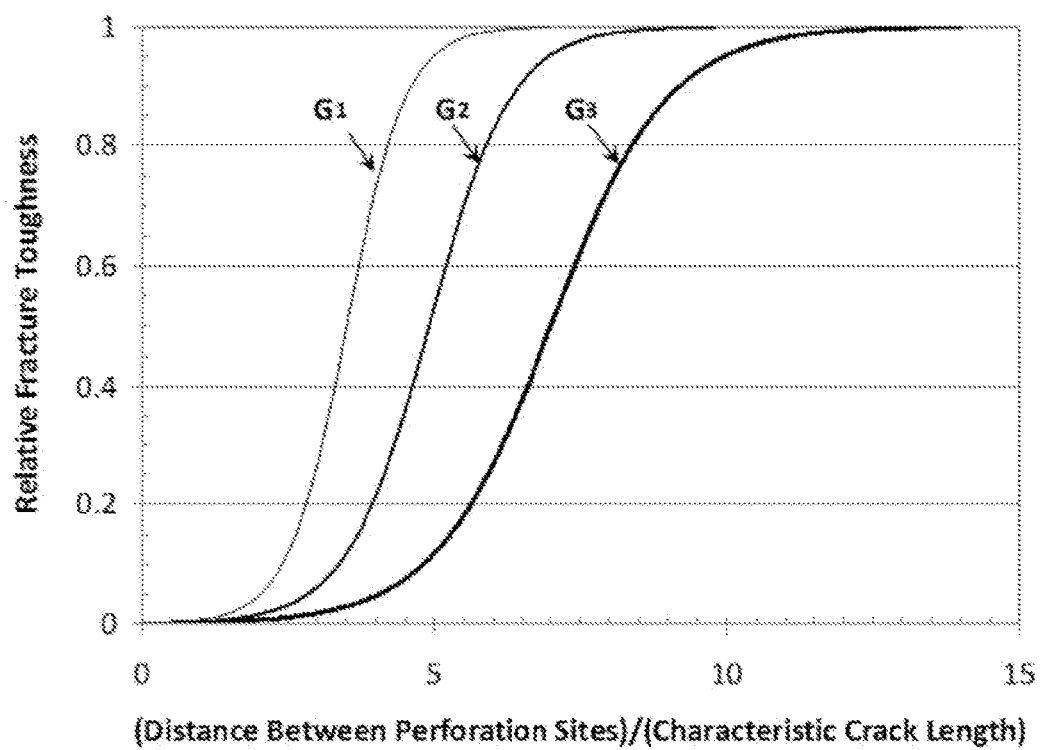
FIG. 16 is a graphical illustration showing relative interface fracture toughness vs. average of the distances between perforation sites (D2)/average of the averaged characteristic crack lengths (D1/2) according to an embodiment.

Turning to FIG. 16, a graphical illustration showing relative interface fracture toughness vs. average of the distances between perforation sites (D2)/average of the averaged characteristic crack lengths of each perforation site (D1/2) is provided. As shown, G1=glass-1 high strength (e.g., Eagle XG® glass), G2=glass-2 intermediate strength (e.g., untempered soda-lime glass), and G3=glass-3 low strength (e.g., the tension layer of ion-exchanged (Gorilla®) or thermally tempered soda-lime glass). It is preferable to obtain an average crack length for each formed perforation, and then to determine an average of the averaged crack lengths for the equation shown in FIG. 16 (although this is not necessary, and one could just obtain one crack length value for each perforation and then average the crack length values obtained for each formed perforation). An average crack length of a single perforation can be determined, for example, by taking the average of three measurements along the perforation in three different places.

Cracks are typically easier to propagate in glass that is under tension. However, tempered glass (both ion-exchanged as well as thermally tempered) have an outer compression layer and corresponding inner tension layer. A crack in the tension layer propagates easier than glass without this tension layer (untempered glass).

The relative fracture toughness values are normalized across all glass types. For example, a relative interface fracture toughness measurement of 1 has approximately the same strength as a pristine version of the particular glass that is to be processed with perforations. A relative interface fracture toughness under 0.2 typically means that the glass will spontaneously separate along an interface defining a contour defined by a series of spaced-apart perforations 1401. This can happen, for example, when the perforation sites are very close together (e.g., overlapping). A relative interface fracture toughness between 0.2 and 0.8 is a range that can be deemed an optimum range. For example, if an easier separation along the contour is desired, then a relative interface fracture toughness closer to 0.2, for example, can be obtained. On the other hand, if a stronger relative interface fracture toughness is desired close to but not including a pristine glass value of 1, then a relative interface fracture toughness closer to 0.8, for example can be obtained and so on.

In order to obtain a desired relative interface fracture toughness number, it is preferable that the specifics about the (1) particular glass (glass substrate composition/type, size (length, width, and depth), (2) desired relative interface fracture toughness, and (3) in turn, the average distances between perforation sites (D2) and the average of the averaged characteristic crack lengths (D1/2) be determined. For example, if a relative interface fracture toughness of 0.5 of an intermediate strength glass G2 is desired, the distance between perforation sites (D2) can=10 microns and the average characteristic crack length (D1/2) can=2 microns, yielding a value of 5 on the x-axis of FIG. 16. Actual average distances and crack length values are shown in FIGS. 17a-b to further illustrate these points, and are further discussed below.

Figure 17A:
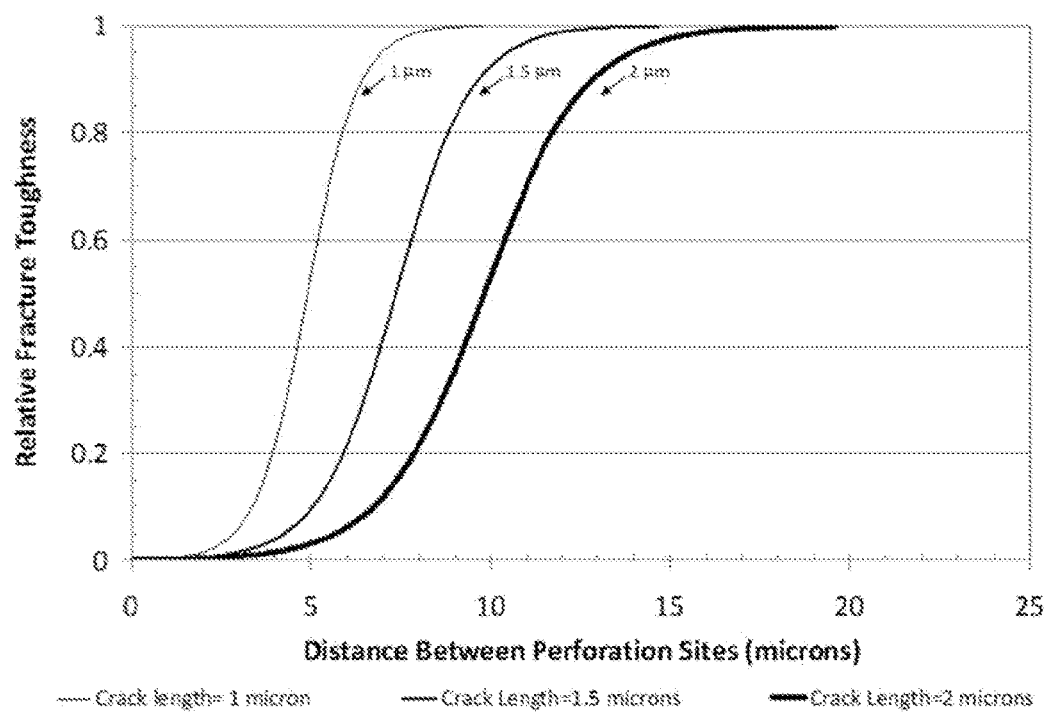
FIGS. 17a-b are graphical illustrations showing relative interface fracture toughness of G2=glass-2 intermediate strength glass vs. actual average of the distances between perforation sites (D2) where actual particular averaged crack lengths (D1) are involved according to an embodiment.
Figure 17B:
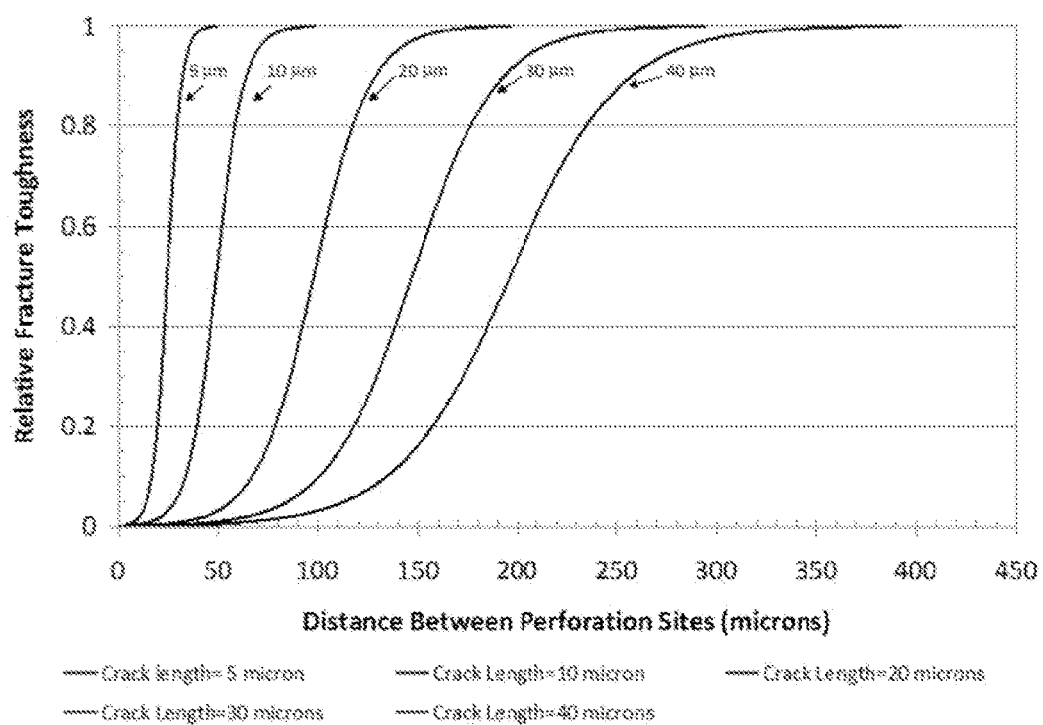

Turning to FIGS. 17a-b, graphical illustrations showing relative interface fracture toughness vs. actual average of the distances between perforation sites (D2) involving G2=glass-2 intermediate strength glass (e.g., soda-lime glass) is provided. FIGS. 17a-b are similar to FIG. 16, in the sense that the controller 1508 can be programmed to create a desired relative interface fracture toughness in view of the particulars of the subject glass substrate and the average of the distances between perforation sites, where, for example, in FIG. 17a—the average of the averaged crack lengths of each perforation site is a particular value such as 1 micron, 1.5 microns, and 2 microns, and in FIG. 17b—the average of the averaged crack lengths of each perforation site is a particular value such as 5 microns, 10 microns, 20 microns, 30 microns, and 40 microns.

The values shown in FIGS. 16 and 17a-b are not the only respective values contemplated by this embodiment that can be used, nor the only particular glass compositions. This embodiment contemplates other values and other compositions, and still be within and supported by the spirit and teaching of this embodiment. FIGS. 16 and 17a-b only show examples. For each glass processing situation, one may expect to generate curve similar to that shown in FIG. 16 or 17a-b. Preferable desired spacing between the perforation sites D2 can be at a range to result in 30-80% reduction of the interface toughness for proposed subsequent induced separation.

Advantages of the embodiments are illustrated by the following Example. However, the particular materials and amounts thereof recited in this Example, as well as other conditions and details, are to be interpreted to apply broadly in the art and should not be construed to unduly restrict or limit the embodiments in any way.

EXAMPLE

The values along the x-axis and resulting values along the y-axis forming the curves shown in FIGS. 16 and 17a-b were determined by experimentation (computer model and/or actual experimental testing). For example, a four point bend procedure for strength testing of glass substrates is performed (this procedure in general should be understood and appreciated by those of skill in the art) to determine the force required to separate a glass substrate along an interface contour created by a plurality of formed spaced-apart perforations (with particular crack lengths and which are separated from one another by particular distances).

In brief, samples (50 mm length×50 mm width×0.7 mm thickness) are tested for strength (load to failure) using the four point bending test. These samples can include a pristine glass sample with no perforations formed therein (as a control), glass samples with perforations formed along a contour (per the system and methods described herein) with each glass sample having a different spacing between subsequent perforations and different crack lengths. An Instron model 5343 single column testing instrument with Bluehill 2 software is used. Samples are covered with tape (471 vinyl tape) on the compression side. Samples are placed flat, centered and square on the support span having distance of 3.6 cm, a load is applied at a rate of 5 mm/min with the load span having a distance of 1.8 mm. Test temperature is about 22° C. and 50% relative humidity. Typically a minimum of 20 samples are tested for load to failure. The data is then plotted as load (lbs or N force) and/or strength to failure (psi or MPa). The results of such experimentations are normalized to a pristine (non-perforated) glass (of each glass type, i.e., G1, G2, and G3, as described above) and then plotted in FIGS. 16-17a-b.

Figure 18:
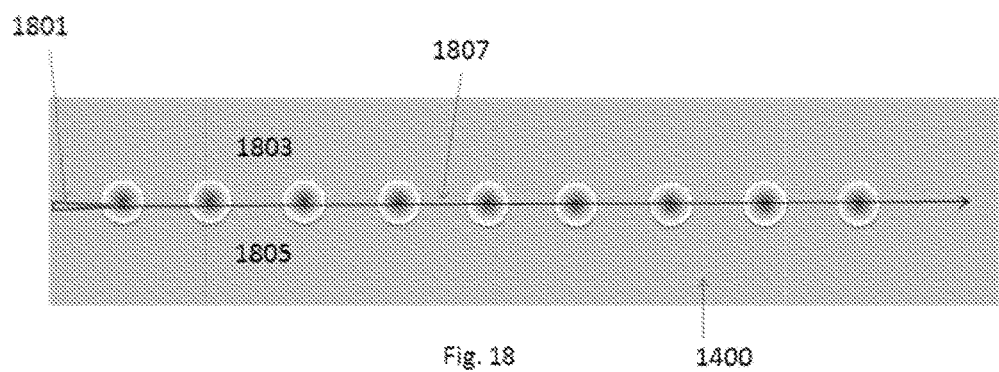
FIG. 18 is a top view of a glass substrate illustrating the start of separation of the glass into components on opposite sides of a contour according to an embodiment.

Turing to FIG. 18, a top view of glass 1400 is shown illustrating the start of separation of the glass 1400 at 1801 into components 1803 and 1805 on opposite sides of the contour 1807. The separation at 1801 can generally start at the top of the glass 1400 (e.g., with a mechanical tool or by thermal or mechanical scoring then separating, as should be appreciated by those skilled in the art) and work its way to the bottom of glass 1400. The absolute relative interface fracture toughness value of the glass substrate 1400 produced by the crack length and D2 positioning will determine how easy it is to separate the glass into components 1803 and 1805 (which should preferably be valued somewhere between 0.2 and 0.8).

Figure 19:
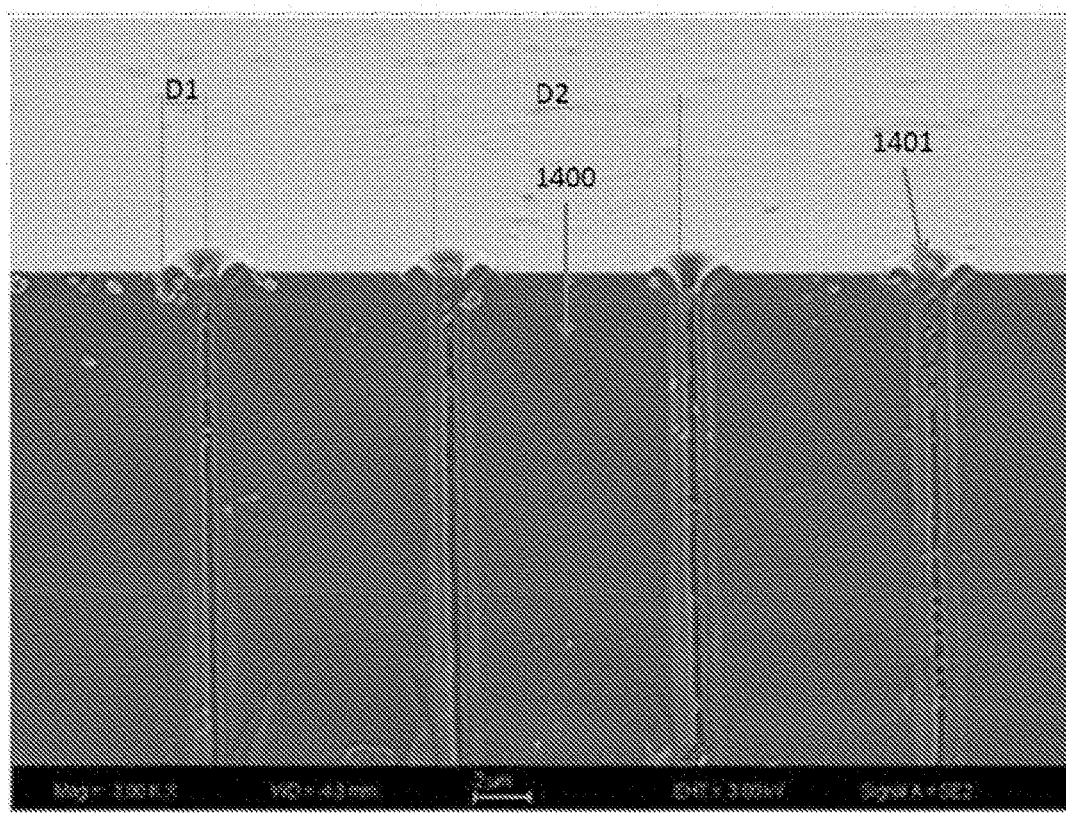
FIG. 19 is a SEM image of a side view of the interface of a glass substrate post perforation formation and separation according to an embodiment.

FIG. 19 shows a SEM image of a side view of the interface of a glass substrate 1400 post perforation 1401 formation and separation. D1 is shown at about 2 microns and D2 is shown at about 8 microns.

A specific example where glass is perforated with optimized spacing such as >100 um in distance can be done at an appropriate translation speed of the laser beam with given repetition rate of the laser. For example, where the laser repletion rate is 200 kHz, but can be modulated at some lower rate to about 10 Khz. In order to get x um distance separation between perforated sites, the translation speed of the laser needs to be X um/1 ms=X×10^−3 m/s, for 100 um spacing it is ~1 m/s.

For strengthened glass, the situation can be different. Due to thermal stress or chemical modification on the surface of the glass, there can be surface layers with compressive stress—which may be as high as a few 100s of MPa, and a central layer of glass with tensile stress—which may be 5-15 MPa. Presence of compressive stress (CS) can make mechanical separation difficult. However, when damage sites in CS exist, the penetration of new crack into this site will be significantly easier due to the void in the material and presence of hoop stress and micro-cracks around a perforated site. The distance between perforation sites needs to large enough so separation of tensile central CT (central tension) layer is not taking place. For each level of CS and CT values as well depth of CS, the distance between damage sites can be optimized as described above.

Figure 20:
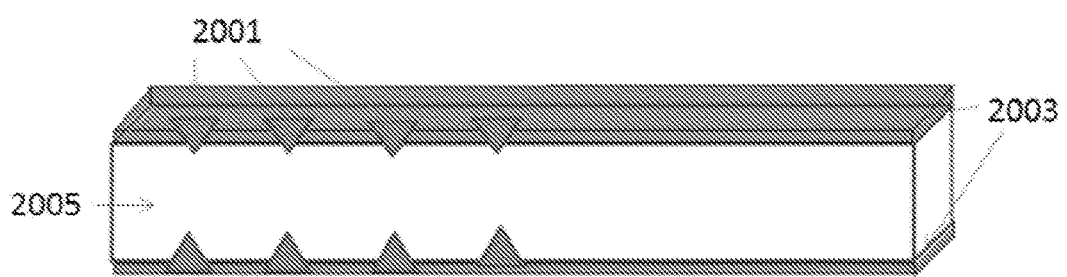
FIG. 20 is a side view of a glass substrate showing the creation of damage only in at least one CS layer, without affecting the CT layer of a glass substrate according to an embodiment.

An option is to create damage only in a CS layer 2003 or both CS layers 2003, without affecting the CT layer 2005 of a glass substrate (see FIG. 20). This may broaden the window of the spacing available for the perforation.

In the case of perforating hot glass, for example, the HAZ zone will be significantly smaller, and hoop stress may be smaller as well.

Figure 21:
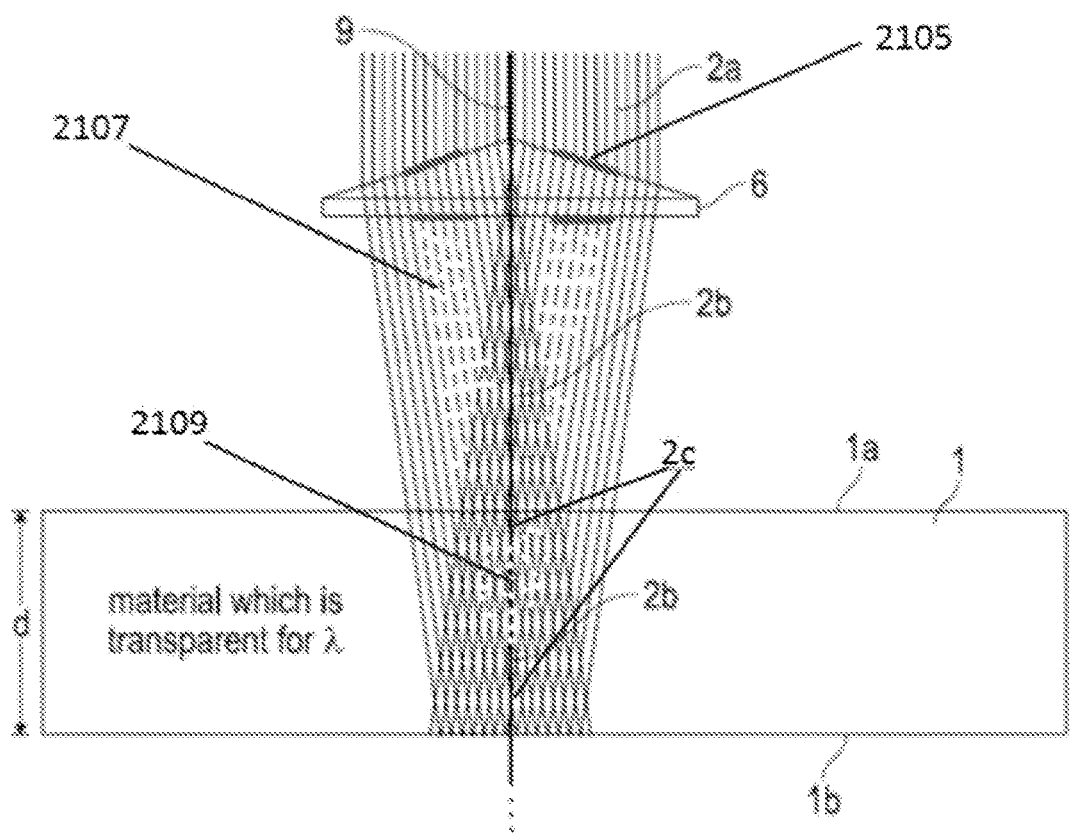
FIG. 21 is an illustration of an alternative optical assembly for laser processing according to an embodiment.

Turning to FIG. 21, an alternative optical assembly 6 is shown. The embodiment shown in FIG. 21 is similar to FIG. 4 (the similarities will not be described again here), except that a portion of the optical assembly 6 includes a reflective coating 2105. As shown, the reflective coating 2105 is placed on the surface of the optical assembly 6. The reflective coating 2105 is configured to block some of the laser radiation 2a (as shown by dashed lines 2107) directed to layer 1 along focal line 2b resulting in a defects closer to the surfaces 1a and 1b of the layer 1 along the focal line 2b at areas of extensive induced absorption 2c, and not in the center of the layer 1 (as shown by dashed lines 2019). In essence, due to the configuration of the reflective coating 2105 on the optical assembly 6, the center of layer 1 along the focal line 2b receives less intensity of laser radiation 2a from a laser pulse resulting in substantially less to preferably no induced absorption 2c (and, thus, substantially less to preferably no cracking in/damage to layer 1 at 2109).

As will be appreciated by one skilled in the art, aspects of particular embodiments may be embodied/implemented as a computer system, method or computer program product. The computer program product can have a computer processor or neural network, for example, which carries out the instructions of a computer program. Accordingly, aspects of particular embodiments may take the form of an entirely hardware embodiment, an entirely software embodiment, and entirely firmware embodiment, or an embodiment combining software/firmware and hardware aspects that may all generally be referred to herein as a "circuit," "module," "system," or an "engine." Furthermore, aspects of particular embodiments may take the form of a computer program product embodied in one or more computer readable medium(s) having computer readable program code embodied thereon.

Any combination of one or more computer readable medium(s) may be utilized. The computer readable medium may be a computer readable signal medium or a computer readable storage medium. A computer readable storage medium may be, for example, but not limited to, an electronic, magnetic, optical, electromagnetic, infrared, or semiconductor system, apparatus, or device, or any suitable combination of the foregoing. More specific examples (a non-exhaustive list) of the computer readable storage medium would include the following: an electrical connection having one or more wires, a hard disk, a random access memory (RAM), a read-only memory (ROM), an erasable programmable read-only memory (EPROM or Flash memory), an optical fiber, a portable compact disc read-only memory (CD-ROM), an optical storage device, a magnetic storage device, or any suitable combination of the foregoing. In the context of this document, a computer readable storage medium may be any tangible medium that can contain, or store a program for use by or in connection with an instruction performance system, apparatus, or device.

The flowcharts/block diagrams/system architecture diagrams in the Figures illustrate the architecture, functionality, and operation of possible implementations of systems, methods, and computer program products according to various embodiments.

The relevant teachings of all patents, published applications and references cited herein, if any, are incorporated by reference in their entirety.

While exemplary embodiments have been described herein, it will be apparent to those skilled in the art that various modifications and variations can be made without departing from the spirit or scope of the claims.

What is claimed is:

1. A system for forming a plurality of defects defining a contour in a workpiece, said workpiece comprising a glass substrate comprising at least one layer and having a normalized pre-defect formation fracture toughness rating of 1.0, the system comprising:
   a laser assembly configured to provide a plurality of laser pulse emissions, each laser pulse emission of the plurality of laser pulse emissions having predetermined characteristics selected from the group consisting of wavelength, power level, pulse duration, and a laser pulse emission rate;
   an optical assembly coupled to the laser assembly, the optical assembly being configured and moveable to focus each laser pulse emission to a different focal line at a different position within said workpiece, wherein:
      each said different focal line is separated from an adjacent different focal line by a predetermined distance,
      a corresponding defect with an average crack length is formed in said workpiece along each different focal line to form a plurality of defects defining a contour in said workpiece, and
      each of said defects being substantially generated by induced absorption;
   a workpiece holder configured to hold said workpiece at a position relative to the optical assembly, said workpiece holder or the optical assembly being configured to provide a relative motion between said workpiece and the optical assembly; and
   a controller coupled to the laser assembly, the optical assembly or said workpiece holder, the controller being configured to execute instructions for a predetermined design, including selecting the predetermined characteristics of the laser assembly, the different positions of the focal lines, or the relative motion between said workpiece and the optical assembly, and wherein the controller is configured to execute instructions based on programmable inputs including the predetermined distances between defects, size of the defects including stress field and crack length, and the average crack lengths for the defects such that a ratio of an average of the predetermined distances between the defects to an average of the averaged crack lengths results in said workpiece having a post-defect formation fracture toughness rating along the contour of less than the normalized pre-defect formation fracture toughness rating.

2. The system of claim 1, wherein said ratio of an average of the predetermined distances to an average of the averaged crack lengths results in said workpiece having a post-defect formation fracture toughness rating along the contour of substantially in a range between about 0.2 and 0.8 relative to the normalized pre-defect formation fracture toughness rating.

3. The system of claim 1, wherein said ratio of an average of the predetermined distances to an average of the averaged crack lengths results in said workpiece having a post-defect formation fracture toughness rating along the contour of substantially in a range between about 0.4 and 0.6 relative to the normalized pre-defect formation fracture toughness rating.

4. The system of claim 1, wherein said ratio is less than or equal to 12.

5. The system of claim 1, wherein said ratio is between 2 and 8.

6. The system of claim 1, wherein said ratio is substantially in a range between about:
   6 and 8 wherein when said glass substrate is a low strength glass substrate;
   4 and 6 wherein when said glass substrate is an intermediate strength substrate; and
   2.5 and 4 wherein when said glass substrate is a high strength glass substrate.

7. The system of claim 1, wherein said ratio is about:
   7 wherein when said glass substrate is a low strength glass substrate;
   5 wherein when said glass substrate is an intermediate strength substrate; and
   3.5 wherein when said glass substrate is a high strength glass substrate.

8. The system according to claim 1, wherein the average of the predetermined distances is substantially in a range between about 2 and 350 microns, and an average of the averaged crack lengths is substantially in a range between about 1 and 40 microns.

9. The system according to claim 1, wherein said optical assembly further comprises a reflective coating configured to block a portion of each laser pulse emission such that each of said different positions is disposed only in a compressive stress layer of said workpiece.

10. The system according to claim 1, wherein each laser pulse emission of the plurality of laser pulse emissions has a pulse duration substantially within a range between about 1 picosecond and about 100 picoseconds.

11. The system of claim 10, wherein the pulse duration is substantially within a range between about 5 picoseconds and about 20 picoseconds.

12. The system according claim 1, wherein the wavelength is selected such that at least a portion of said workpiece is substantially transparent to the laser pulse emission.

13. The system according to claim 1, wherein each defect of the plurality of defects is implemented with a predetermined defect modality wherein the predetermined defect modality is selected from a group of modalities consisting of a crack, a perforation or a channel within said workpiece.

14. The system according to claim 1, wherein said workpiece is further comprised of a material selected from a group of materials consisting of glass, plastic, polymer, rubber, semiconductor, softboard material, ceramic, metallic materials, piezoelectric materials, gaseous materials, liquid crystal materials, indium tin oxide material or electrochromic glass.

15. The system according to claim 1, further comprising a separation mechanism configured to divide said workpiece into workpiece subcomponents along the contour in accordance with the plurality of defects to implement the predetermined design.

16. The system of claim 15, wherein the separation mechanism is selected from the group consisting of an external force applying mechanism and a scoring mechanism.

17. The system of claim 1, wherein said ratio is less than or equal to:
- 12 wherein when said glass substrate is a low strength glass substrate;
- 6 wherein when said glass substrate is an intermediate strength substrate; and
- 6 wherein when said glass substrate is a high strength glass substrate.

18. The system of claim 1, wherein said ratio is substantially in a range between about:
- 2 and 8 wherein when said glass substrate is a low strength glass substrate;
- 2 and 6 wherein when said glass substrate is an intermediate strength substrate; and
- 1 and 4 wherein when said glass substrate is a high strength glass substrate.

\* \* \* \* \*

UNITED STATES PATENT AND TRADEMARK OFFICE
CERTIFICATE OF CORRECTION

PATENT NO.         : 10,611,667 B2
APPLICATION NO.    : 15/325636
DATED              : April 7, 2020
INVENTOR(S)        : Dana Craig Bookbinder et al.

It is certified that error appears in the above-identified patent and that said Letters Patent is hereby corrected as shown below:

On the Title Page

On page 5, in Column 1, item [56], Other Publications, Line 11, delete "Califomia;" and insert -- California; --, therefor.

On page 5, in Column 1, item [56], Other Publications, Line 20, delete "TheAnti" and insert -- The Anti --, therefor.

On page 5, in Column 1, item [56], Other Publications, Line 54, delete "i-30." and insert -- 1-30. --, therefor.

On page 6, in Column 2, item [56], Other Publications, Lines 45-46, delete "Eelectropolishing;" and insert -- Electropolishing; --, therefor.

In the Claims

In Column 24, Line 50, Claim 12, after "according" insert -- to --.

Signed and Sealed this
Twenty-fifth Day of October, 2022

Katherine Kelly Vidal
*Director of the United States Patent and Trademark Office*